(12) United States Patent
Nako et al.

(10) Patent No.: US 6,972,752 B2
(45) Date of Patent: Dec. 6, 2005

(54) DISPLAY DEVICE

(75) Inventors: Kazuyuki Nako, Tenri (JP); Minako Kuwata, Ikoma (JP); Keisuke Iwasaki, Ikoma-gun (JP); Shigeki Kuga, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 52 days.

(21) Appl. No.: 10/849,394

(22) Filed: May 18, 2004

(65) Prior Publication Data

US 2004/0212602 A1 Oct. 28, 2004

Related U.S. Application Data

(63) Continuation of application No. 09/622,966, filed as application No. PCT/JP99/00661 on Feb. 15, 1999, now Pat. No. 6,788,292.

(30) Foreign Application Priority Data

Feb. 25, 1998 (JP) .................................. 10-43210
Mar. 23, 1998 (JP) .................................. 10-73974

(51) Int. Cl.⁷ .............................................. G09G 5/00
(52) U.S. Cl. ...................................... 345/173; 345/901
(58) Field of Search .......................... 345/1.1, 103, 901, 345/903, 961

(56) References Cited

U.S. PATENT DOCUMENTS

| | | | |
|---|---|---|---|
| 5,463,725 A | 10/1995 | Henckel et al. | |
| 5,467,102 A | 11/1995 | Kuno et al. | |
| 5,485,176 A | 1/1996 | Ohara et al. | |
| 5,794,365 A | 8/1998 | Hindermeyer et al. | |
| 5,847,698 A | 12/1998 | Reavey et al. | |
| 5,932,863 A | 8/1999 | Rathus et al. | |
| 6,002,401 A * | 12/1999 | Baker | 715/839 |
| 6,072,476 A | 6/2000 | Harada et al. | |
| 6,201,947 B1 * | 3/2001 | Hur et al. | 434/317 |
| 6,278,455 B1 * | 8/2001 | Baker | 715/716 |
| 6,297,812 B1 | 10/2001 | Ohara et al. | |
| 2004/0047208 A1 * | 3/2004 | Hoddie et al. | 365/202 |
| 2004/0080541 A1 * | 4/2004 | Saiga et al. | 345/805 |

FOREIGN PATENT DOCUMENTS

| | | |
|---|---|---|
| EP | 0 618 715 A1 | 10/1994 |
| JP | 63116287 | 5/1988 |
| JP | 02148257 A | 6/1990 |
| JP | 02230313 A | 9/1990 |
| JP | 3-44223 | 9/1991 |
| JP | 03217959 A | 9/1991 |
| JP | 05-174074 | 12/1991 |
| JP | 6-83779 | 3/1994 |

(Continued)

OTHER PUBLICATIONS

Nov. 9, 2004 Office Action in connection with counterpart Japanese Patent Application No. 10-043210, and English language translation thereof.

*Primary Examiner*—Amare Mengistu
(74) *Attorney, Agent, or Firm*—David G. Conlin; Edwards & Angell

(57) ABSTRACT

A display device capable of allowing a page to be turned to give a feeling as if a page is actually turned includes a memory for storing information, a display for displaying information, a page turn instruction unit for detecting that the unit itself is tilted to output a detection signal indicating the direction of the tilt, and a display control unit for receiving an instruction from the page turn instruction unit to read information of the next or previous page from the memory according to the direction of the tilt and display the read information on the display.

2 Claims, 27 Drawing Sheets

FOREIGN PATENT DOCUMENTS

| | | |
|---|---|---|
| JP | 06290017 A | 10/1994 |
| JP | 08076926 A | 3/1996 |
| JP | 06-244127 | 4/1996 |
| JP | 2580760 | 11/1996 |
| JP | 9-6538 | 1/1997 |
| JP | 09069023 A | 3/1997 |
| JP | 09265470 A | 10/1997 |
| JP | 11-85108 | 3/1999 |
| KR | 1994-703548 | 10/1994 |
| KR | 1997-7593 | 2/1997 |

* cited by examiner

FIG. 31A
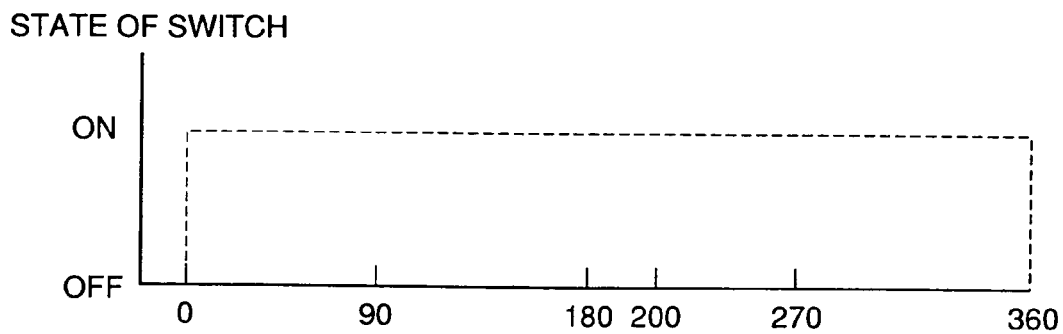
FIG. 31B
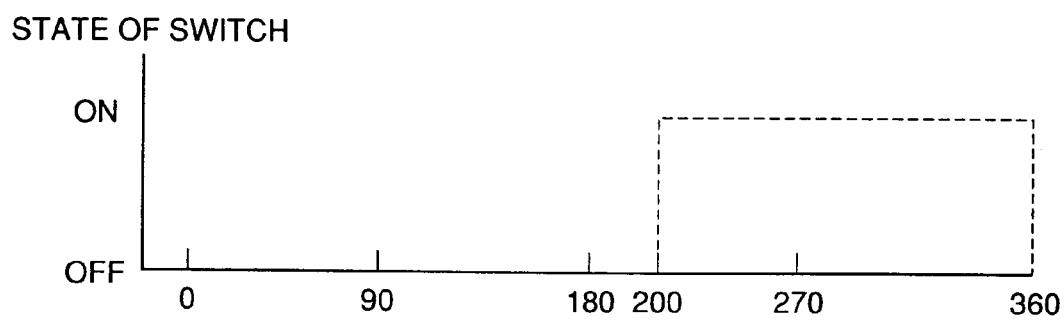
FIG. 32
| STATE OF 1ST SWITCH | STATE OF 2ND SWITCH | STATE OF FLAT DISPLAY 4A | STATE OF FLAT DISPLAY 4B |
|---|---|---|---|
| ON | ON | NOT DISPLAY | DISPLAY |
| ON | OFF | DISPLAY | DISPLAY |
| OFF | ON | NOT DISPLAY | NOT DISPLAY |
| OFF | OFF | NOT DISPLAY | NOT DISPLAY |

| STATE OF SWITCH | STATE OF CONTACT | STATE OF FLAT DISPLAY 4A | STATE OF FLAT DISPLAY 4B |
|---|---|---|---|
| ON | NOT DIFFER | DISPLAY | DISPLAY |
| ON | DIFFER | NOT DISPLAY | DISPLAY |
| OFF | NOT DIFFER | DISPLAY | DISPLAY |
| OFF | DIFFER | DISPLAY | DISPLAY |

| STATE OF 1ST SWITCH | STATE OF 2ND SWITCH | STATE OF 3RD SWITCH | STATE OF FLAT DISPLAY 4A | STATE OF FLAT DISPLAY 4B |
|---|---|---|---|---|
| OFF | ON | OFF | NOT DISPLAY | NOT DISPLAY |
| OFF | ON | ON | NOT DISPLAY | NOT DISPLAY |
| OFF | OFF | ON | NOT DISPLAY | NOT DISPLAY |
| OFF | OFF | OFF | NOT DISPLAY | NOT DISPLAY |
| ON | ON | ON | DISPLAY | DISPLAY |
| ON | ON | OFF | NOT DISPLAY | DISPLAY |
| ON | OFF | OFF | DISPLAY | DISPLAY |
| ON | OFF | ON | DISPLAY | DISPLAY |

DISPLAY DEVICE

CROSS REFERENCE TO RELATED APPLICATIONS

The present invention is a continuation of, claims priority from, and incorporates by reference the entirety of U.S. patent application Ser. No. 09/622,996, which was filed on Aug. 25, 2000, now U.S. Pat. No. 6,788,292 which is a 371 of PCT/JP 99/00661, filed Feb. 15, 1999.

TECHNICAL FIELD

The present invention relates to display devices. In particular, the invention relates to a display device capable of displaying data by using openable display means like a book and allowing a user to turn a page in a feeling that the user actually turns a page.

BACKGROUND ART

Conventional portable type display devices which display an electronic book and the like causes a page to be turned by pressing of a page forward or a page backward button.

Japanese Patent No. 2580760 (Japanese Patent Laying-Open No. 2-230313) discloses a browsing device which gives an instruction to cause a page to be turned by a user rotating a rotation sensor. This Japanese Patent also discloses instruction for turning a page by using a pressure sensor. According to this, the direction and speed of browsing are determined by a pressure difference between a pressure sensor for positive browsing and a pressure sensor for negative browsing. Above Japanese Patent further discloses instruction for turning a page by using a curvature sensor and a switch. According to this, the speed of browsing is calculated based on the magnitude of curvature detected by the curvature sensor and the direction of browsing is determined based on the state of the switch.

Japanese Patent Laying-Open No. 2-148257 discloses a portable document processor having a display screen corresponding to one page. This processor causes display data corresponding to one page to be read from a memory by pressing of a page forward key, and the read display data is stored in a display buffer memory. The display data corresponding to one page is thus stored in the display buffer memory so as to display the data of one page on the display screen. In this way, a user can read documents as if the user reads a book by turning pages.

Japanese Patent Laying-Open No. 63-116287 discloses a display device having two openable display screens. A user can turn pages by operating an input key.

The browsing device mentioned above causes a page to be turned by pressing of a button or rotating of a roller, which is different from the usual turning of pages of a book or magazine. In this case, an electronic book cannot be read to give a sense that a page of a book or magazine made of sheets of paper, plastics or the like is actually turned.

It would be convenient if pages can be turned without touching of a button or roller with a finger or the like.

The above browsing device and portable document processor have only one display screen, which is not necessarily convenient for use of the device.

Although the display device described above has two display screens, the screens as a whole cannot be folded back to back for use. As a result, the display device occupies a large area to make it difficult to hold the display device in one hand, causing a problem about portability. Even if the display device can be folded back to back, data is always displayed on one of the screens which is not watched by a user, resulting in a problem about leakage of information and power consumption.

In addition, since the above display device cannot be folded back to back, if the device is used for playing a competitive game, for example, in which preferably a player does not show the player's own cards, the player cannot keep the cards secret from an opponent.

DISCLOSURE OF THE INVENTION

One object of the present invention is accordingly to provide a display device capable of turning a page of an electronic book to give a feeling that a page of a book or magazine made of sheets of paper, plastics or the like is actually turned.

Another object of the invention is to provide a display device capable of turning a page to give a feeling that a page is actually turned and further capable of turning pages one by one and turning pages successively by the same operation.

Still another object of the invention is to provide a display device capable of turning a page even if a user does not shift a pointer such as hand and finger to a button.

A further object of the invention is to provide a display device capable of being folded back to back and held in one hand, which is small in size, superior in portability and consumes less power and is also appropriate for use to play a competitive game.

A further object of the invention is to provide a display device which is superior in prevention of information leakage and consumes less power.

According to one aspect of the invention, a display device includes a memory for storing information, a display for displaying information, a page turn instruction unit for detecting that the instruction unit itself is tilted to output a detection signal indicating direction of the tilt, and a display control unit for receiving an instruction from the page turn instruction unit to read information of a next or previous page from the memory according to the direction of the tilt and display the read information on the display.

In response to sliding of a finger or hand of a user over the page turn instruction unit, the display control unit turns a page. In this way, the user can turn a page in a feeling as if the user actually turns a sheet of paper with a hand.

According to another aspect of the invention, a display device includes a memory for storing information, a display for displaying information, a page turn instruction unit for detecting direction of movement of a pointer to output a detection signal indicating the direction of the movement, and a display control unit for receiving an instruction from the page turn instruction unit to read information of a next or previous page from the memory according to the direction of the movement of the pointer and display the read information on the display.

In response to movement of a pointer such as a finger and hand of a user over the page turn instruction unit, the display control unit turns a page. In this way, the user can turn a page in a feeling as if the user actually turns a sheet of paper with a hand.

Preferably, the display control unit includes a unit for receiving an instruction from the page turn instruction unit to read from the memory information of a page determined according to the direction of movement of the pointer and a time period in which the pointer touches the page turn instruction unit and accordingly display the read information on the display.

The display control unit changes the number of pages to be turned according to the time period in which the pointer touches the page turn instruction unit. In this way, pages can be turned one by one and can be turned successively by the same operation.

According to a further aspect of the invention, a display device includes a display for displaying information, a page turn instruction unit for detecting a position touched by a pointer to output a detection signal indicating the touched position, and a display control unit for receiving an instruction from the page turn instruction unit to read information of a next or previous page from a memory according to change of the position touched by the pointer and display the read information on the display.

A user can turn a page by touching twice the page turn instruction unit with a pointer. The direction of turning a page is determined according to change of the touched position. In this way, the user can turn a page in a feeling as if the user actually turns a sheet of paper with a hand.

According to a further aspect of the invention, a display device includes a memory for storing information, a display formed of at least two openable and closable screens for displaying information, a page turn instruction unit for detecting an open/close operation of the display to output a detection signal, and a display control unit for receiving an instruction from the page turn instruction unit to switch information displayed on the display according to the detected open/close operation.

A user can turn a page by an open/close operation of the display. In this way, the user can turn a page without moving a pointer such as a hand and finger to a button while holding the display device.

According to a further aspect of the invention, a display device includes a memory for storing information, a display for displaying information, a speaker for outputting sound, a page turn instruction unit for issuing an instruction to switch information displayed on the display, a display control unit for receiving the instruction from the page turn instruction unit to switch information displayed on the display, and a sound output control unit connected to the display control unit for outputting a sound of turning a sheet of paper from the speaker according to switching of information displayed on the display.

The sound output control unit outputs the sound of turning a sheet of paper simultaneously with turning of a page. In this way, a user can turn a page in a feeling as if the user turns a sheet of paper.

Preferably, the speaker is formed of at least two speakers, and the sound output control unit includes a circuit connected to the display control unit to output from the speakers the sound of turning a sheet of paper according to switching of information displayed on the display and to output the sound while changing the volume of the sound output from at least two speakers according to direction of switching information.

According to the direction of turning a page by a user, the sound of turning a sheet of paper is generated with the center of sound shifted. In this way, the user can turn a page in a feeling as if the user actually turns a sheet of paper.

According to a further aspect of the invention, a display device includes a memory for storing information, a display formed of at least two openable and closable screens for displaying information, a rotation angle detection unit for detecting an angle of rotation of the display, and a display control unit connected to the rotation angle detection unit for controlling, according to the angle of rotation of the display, whether the display provides display or not.

The display control unit can make a control to cause a screen which is not watched by a user not to provide display, when the user folds the display back to back. Thus, it is possible to provide a display device which is superior in prevention of information leakage. It is also possible to reduce power consumption of the display device. Further, it is possible to provide a display device superior in portability, having a display which can be freely rotated by a user to enable the user to watch the display even if the area occupied by the display device is reduced.

Preferably, the display device further includes a fixing unit for fixing the display at an angle of rotation in a predetermined range.

The user can fix the display at an angle of rotation in a predetermined range. In this way, the user can play a competitive game without allowing the user's cards to be revealed to an opponent.

According to a further aspect of the invention, a display device includes a memory for storing information, a display formed of at least two openable and closable display screens for displaying information, a tablet unit formed of at least two components provided corresponding to respective display screens for detecting an area where a pointer touches the display, and a display control unit connected to the tablet unit for controlling whether the display provides display or not according to the area where the pointer touches the tablet unit.

The display control unit determines which of the screens of the display is watched by a user according to the area where a pointer such as finger touches the tablet unit, so as not to provide display on a screen which is not watched by the user. It is thus possible to provide a display device superior in prevention of information leakage. Reduction of power consumption of the display device is also possible.

BRIEF DESCRIPTION OF THE DRAWINGS

FIG. 31A shows a state of the first switch.

FIG. 31B shows a state of a second switch.

FIG. 32 illustrates a relation between states of the first and second switches and states of display on flat displays 4A and 4B.

BEST MODES FOR CARRYING OUT THE INVENTION

First Embodiment

Figure 1:
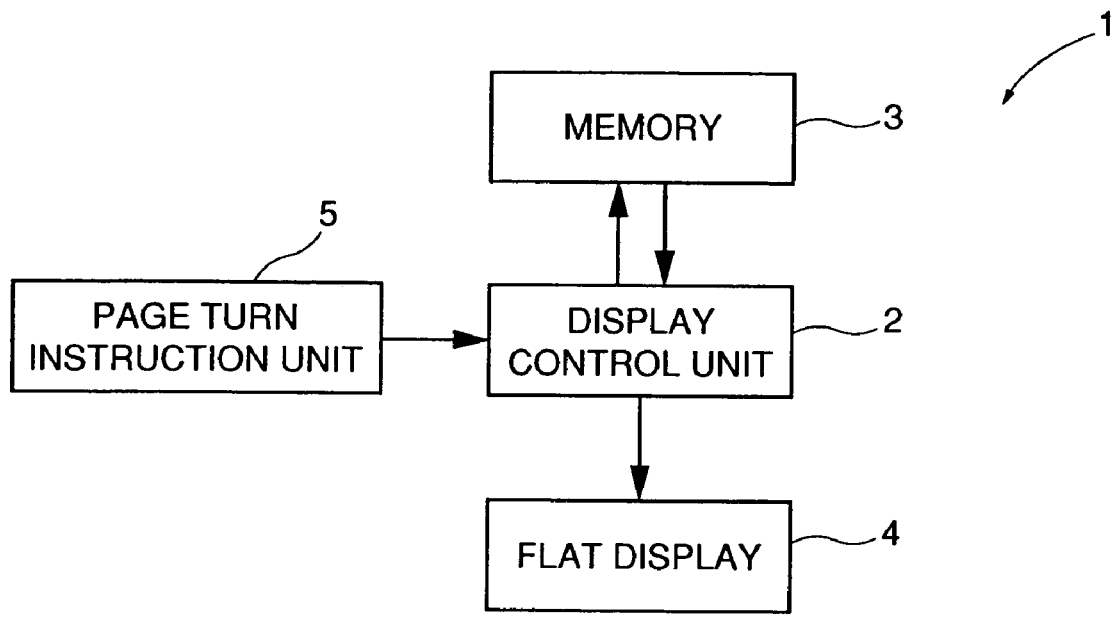
FIG. 1 is a block diagram showing a structure of a display device according to a first embodiment.

Referring to FIG. 1, a display device 1 according to the first embodiment includes a memory 3 constructed of a magnetic memory device such as semiconductor memory, hard disc and MO (Magneto-Optical) for storing image information, character information and the like, a flat display 4 constructed of a liquid crystal panel, a PDP (Plasma Display Panel) or the like for displaying image information, character information and the like, a display control unit 2 for controlling reading of image information, character information and the like stored in memory 3 and displaying of the read information on flat display 4, and a page turn instruction unit 5 for receiving a page turn instruction from a user to instruct display control unit 2 to turn a page.

The user hereinafter referred to includes an artificial body such as a robot and a software agent in addition to animals such as a human being.

Figure 2:
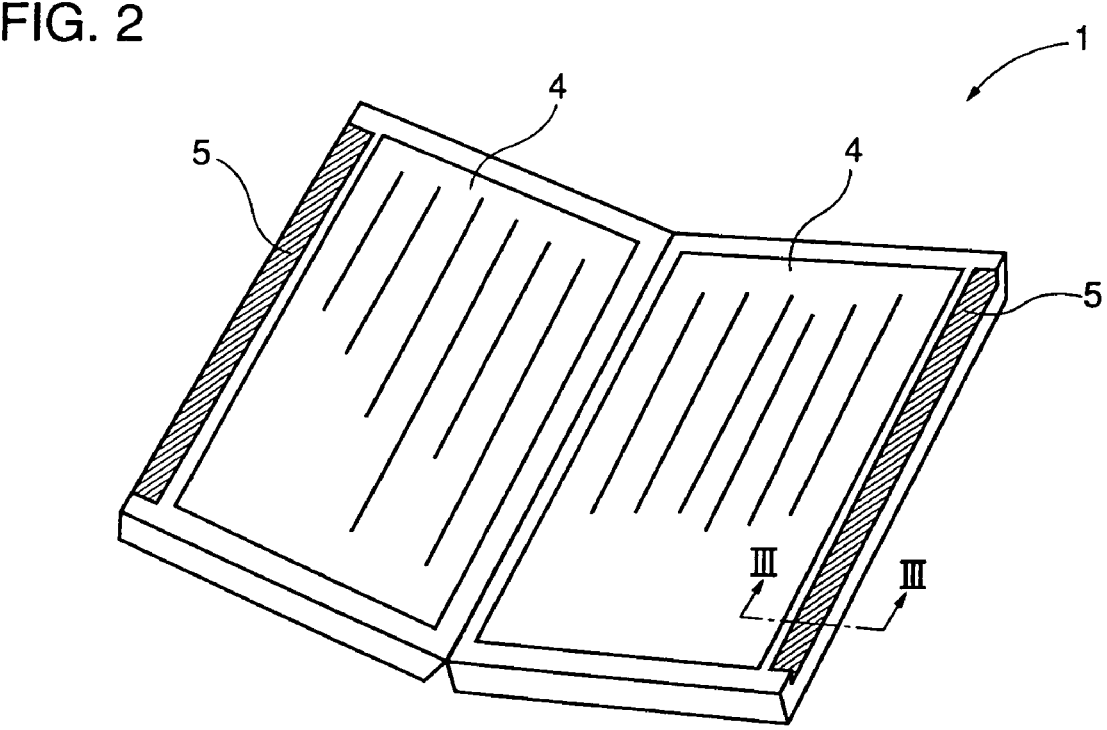
FIG. 2 shows an exterior of the display device according to the first embodiment.

Referring to FIG. 2, display device 1 employs two flat displays 4 and two page turn instruction units 5. The number of flat displays 4 and that of page turn instruction units 5 each are not limited to two, and may be one or may be at least three. If the number of flat displays 4 and that of page turn instruction units 5 are each three or more, they may be constructed such that the displays and instruction units are folded when they are not used and opened in use. Although FIG. 2 shows flat displays 4 arranged to face each other, the arrangement is not limited thereto.

Page turn instruction unit 5 is arranged on one side of display device 1. Display control unit 2 and memory 3 are arranged within display device 1.

Figure 3:
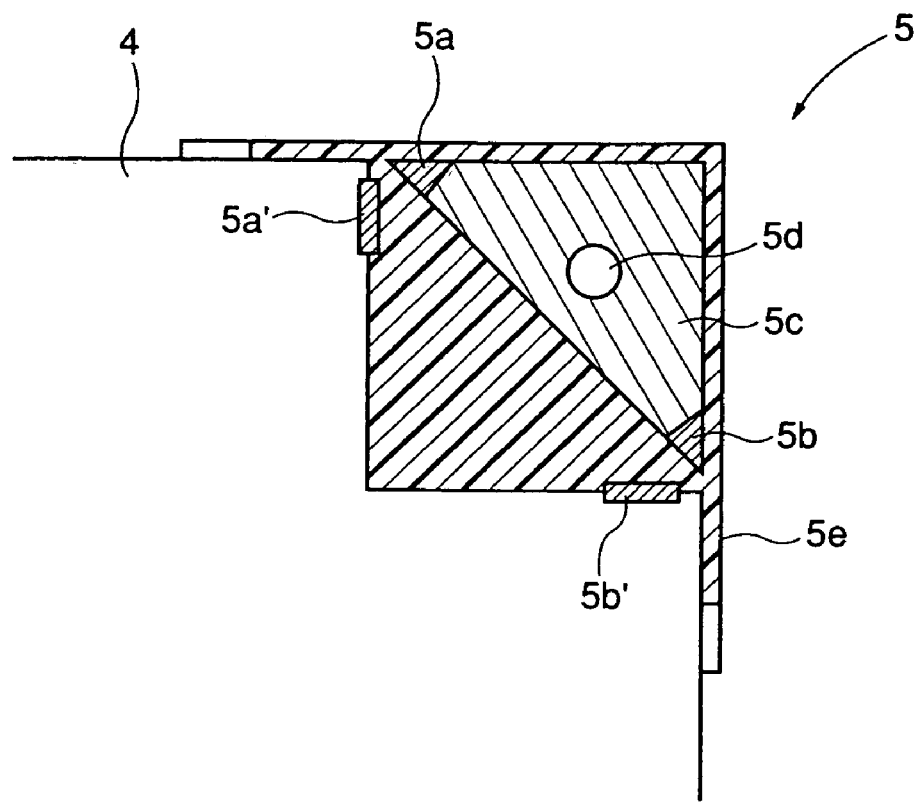
FIG. 3 is a cross sectional view of a page turn instruction unit.

FIG. 3 is a cross sectional view along line III—III of page turn instruction unit 5 in FIG. 2. Page turn instruction unit 5 is constructed of a support shaft 5d, a switch 5c in the shape of a column rotating about support shaft 5d, and contacts 5a' and 5b'. Switch 5c has contacts 5a and 5b on both edges. Switch 5c rotates anticlockwise in FIG. 3 about support shaft 5d to allow contacts 5a and 5a' to be brought into contact with each other. Rotation of switch 5c clockwise in FIG. 3 about support shaft 5d allows contacts 5b and 5b' to be in contact with each other. Switch 5c is supported by a spring (not shown) and stable when the contacts do not touch each other. The surface of switch 5c is covered with a film 5e of rubber, silicon, plastics or the like. Accordingly, page turn instruction unit 5 is reinforced, any electrical damage is avoided, and foreign matters such as dust do not enter display device 1.

Figure 4:
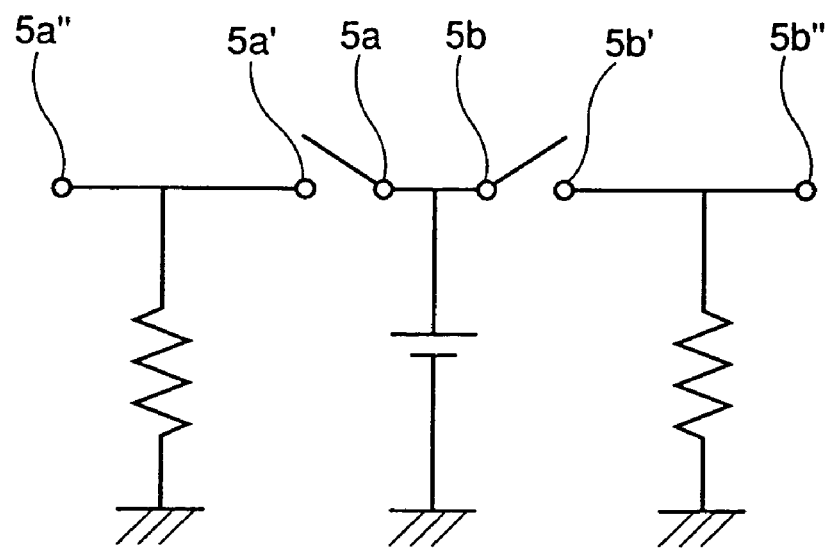
FIG. 4 is an equivalent circuit diagram of the page turn instruction unit.

FIG. 4 is an equivalent circuit diagram of page turn instruction unit 5. The instruction unit is structured such that contacts 5b and 5b' do not touch each other when contacts 5a and 5a' are in contact with each other. There is usually a stable state when all contacts do not touch each other. Potential on a point 5a" changes when contacts 5a and 5a' come into contact with each other. Potential on a point 5b" changes when contacts 5b and 5b' come into contact with each other. Display control unit 2 detects an instruction to turn a page by detecting a change of the potential on point 5a" or point 5b".

Referring again to FIG. 3, a user slides the user's finger or hand on page turn instruction unit 5 in the direction of upper left or lower right. Switch 5c is accordingly rotated. The wording "slide" also refers to pressing of any location near contact 5a or 5b with a finger or hand. In other words, this wording means an operation similar to turning of a page of a book made of paper with a hand. Rotation of switch 5c causes change of the potential on point 5*a*″ or 5*b*″, so that display control unit 2 can detect the direction intended by the user.

For example, when the user slides a finger or hand on page turn instruction unit 5 on the left side in the direction of upper right, display control unit 2 turns a page in the forward direction. When the user slides a finger or hand on the right side page turn instruction unit 5 in the direction of upper left, display control unit 2 turns the page in the reverse direction. Thus, the user can perform page turning as if the user actually turns a sheet of paper with hand.

When the user slides a finger or hand on the left side page turn instruction unit 5 in the direction of lower left, display control unit 2 turns the page in the reverse direction. When the user slides a finger or hand on the right side page turn instruction unit 5 in the direction of lower right, display control unit 2 turns the page in the forward direction. Such a control by display control unit 2 enables the user to turn a page in the forward and reverse directions by using only one page turn instruction unit 5. The user can thus turn a page with one hand.

Second Embodiment

Figure 5:
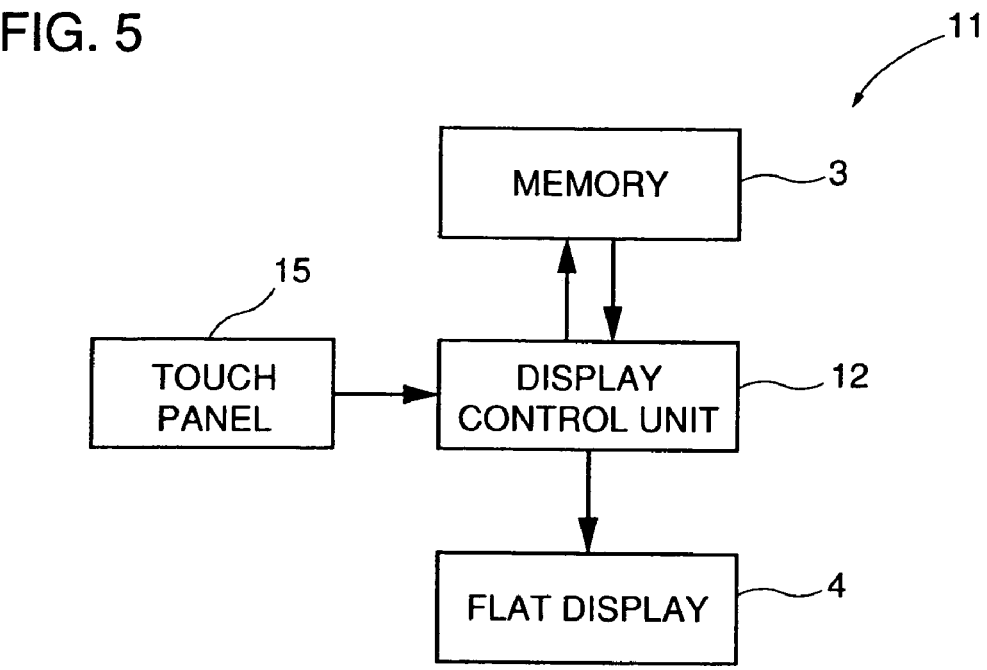
FIG. 5 is a block diagram showing a structure of a display device according to a second embodiment.

Referring to FIG. 5, a display device 11 according to the second embodiment includes a memory 3 similar to that in the first embodiment, a flat display 4 similar to that in the first embodiment, a display control unit 12 for controlling reading of image information, character information and the like stored in memory 3 and displaying of the read information on flat display 4, and a touch panel 15 arranged to entirely cover flat display 4 to receive a page turn instruction from a user and give an instruction to display control unit 2 so as to turn a page.

Figure 6:
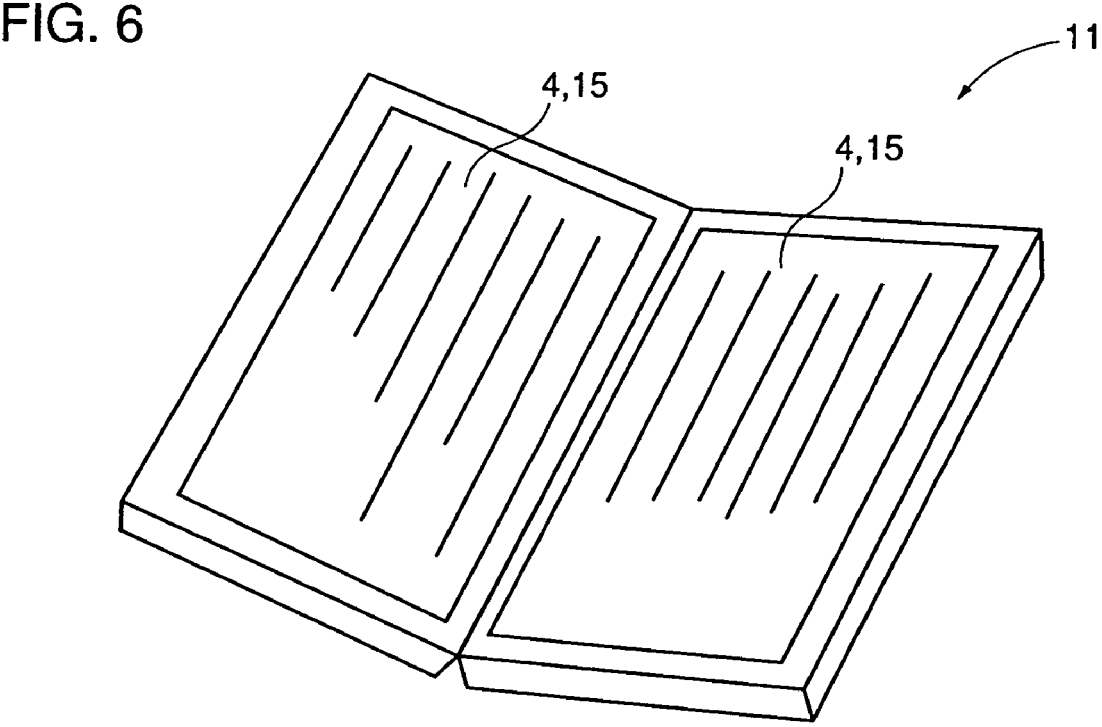
FIG. 6 shows an exterior of the display device according to the second embodiment.

Referring to FIG. 6, display device 11 according to the second embodiment includes two flat displays 4 and two touch panels 15, and the two sets of flat displays 4 and touch panels 15 are arranged to face each other. The number of sets of flat displays 4 and touch panels 15 is not limited to two, and the number may be one or at least three. Display control unit 12 and memory 3 are arranged within display device 11.

Touch panel 15 is a sensor detecting a position touched by a pointer such as finger and pen. Display control unit 12 switches information displayed on flat display 4 according to the direction in which the pointer moves over touch panel 15. Display control unit 12 changes the number of pages to be turned according to the time period in which the pointer is in contact with the touch panel.

Figure 7:
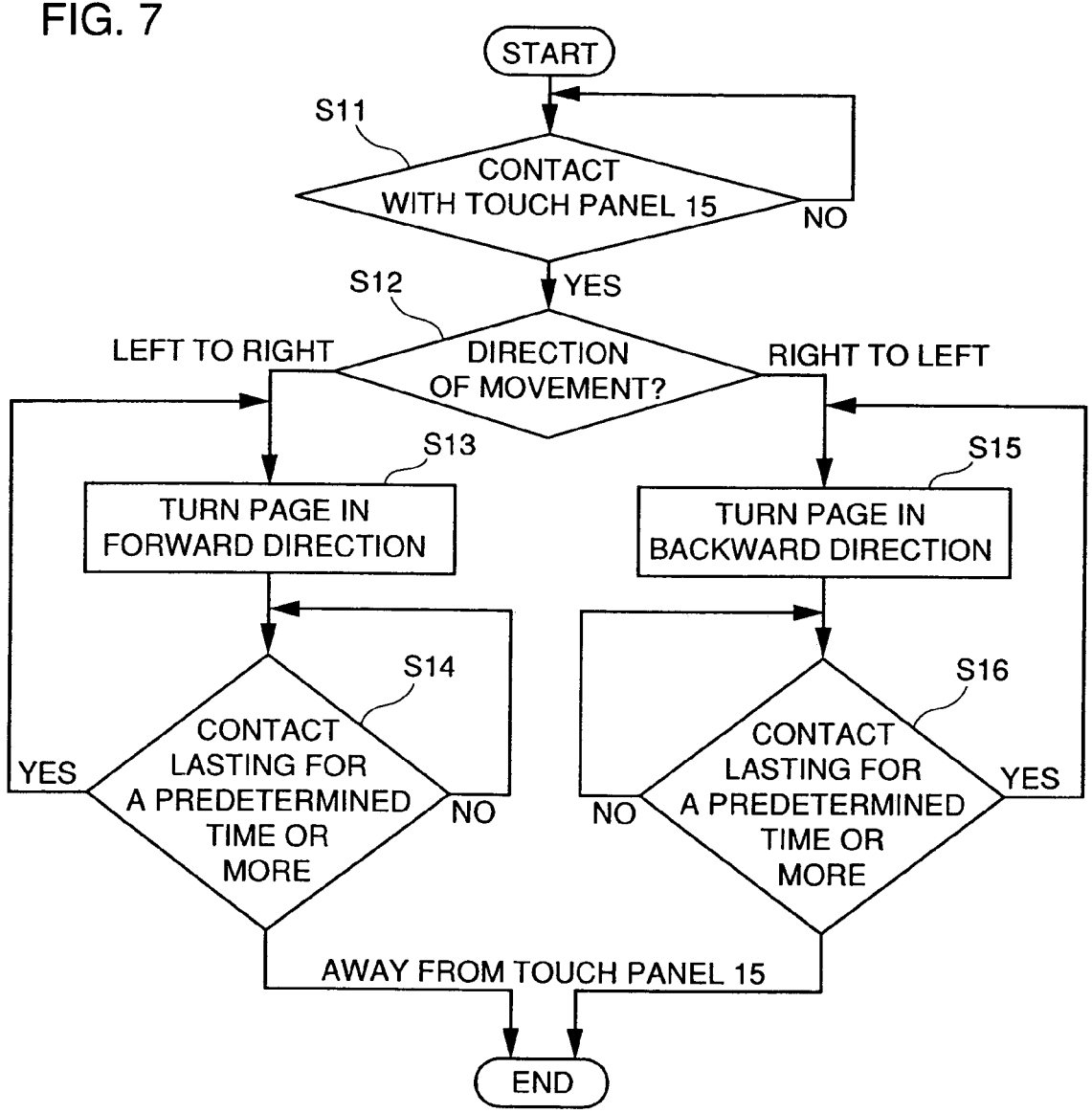
FIGS. 7 and 8 are flowcharts showing a page turning process.

Referring to FIG. 7, a page turn control process performed by display control unit 12 is described. A book referred to here is supposed to have a vertical writing with a page of a smaller number displayed on the right side flat display 4. If the book have a horizontal writing with a page of a smaller number displayed on the left side flat display 4, the forward and backward directions are interchanged.

Display control unit 12 determines if touch panel 15 detects contact with a pointer such as a finger and pen (S11). If touch panel 16 does not detect contact with the pointer (NO in S11), display control unit 12 repeats the process in S11 until touch panel 15 detects contact with the pointer.

When touch panel 15 detects contact with the pointer (YES in S11), display control unit 12 determines the direction in which the pointer moves over touch panel 15 (S12). If the pointer moves from left to right (LEFT TO RIGHT in S12), display control unit 12 turns a page in the forward direction (S13). After this, display control unit 12 determines if contact between the pointer and touch panel 15 lasts for a predetermined time or more (S14). If the time of contact between the pointer and touch panel 15 is less than the predetermined time (NO in S14), display control unit 12 repeats the process in S14. If the time of contact between the pointer and touch panel 15 is at least the predetermined time (YES in S14), display control unit 12 turns a page again in the forward direction (S13). When the pointer leaves touch panel 15 (AWAY FROM TOUCH PANEL 15 in S14), the process by display control unit 12 is completed.

If the pointer moves from right to left (RIGHT TO LEFT in S12), display control unit 12 turns a page in the backward direction (S15). After this, display control unit 12 determines if contact between the pointer and touch panel 15 lasts for a predetermined time or more (S16). If the time of contact between the pointer and touch panel 15 is less than the predetermined time (NO in S16), display control unit 12 repeats the process in S16. If the time of contact between the pointer and touch panel 15 is at least the predetermined time (YES in S16), display control unit 12 turns a page again in the backward direction (S15). When the pointer leaves touch panel 15 (AWAY FROM TOUCH PANEL 15 in S16), the process by display control unit 12 is completed.

Figure 8:
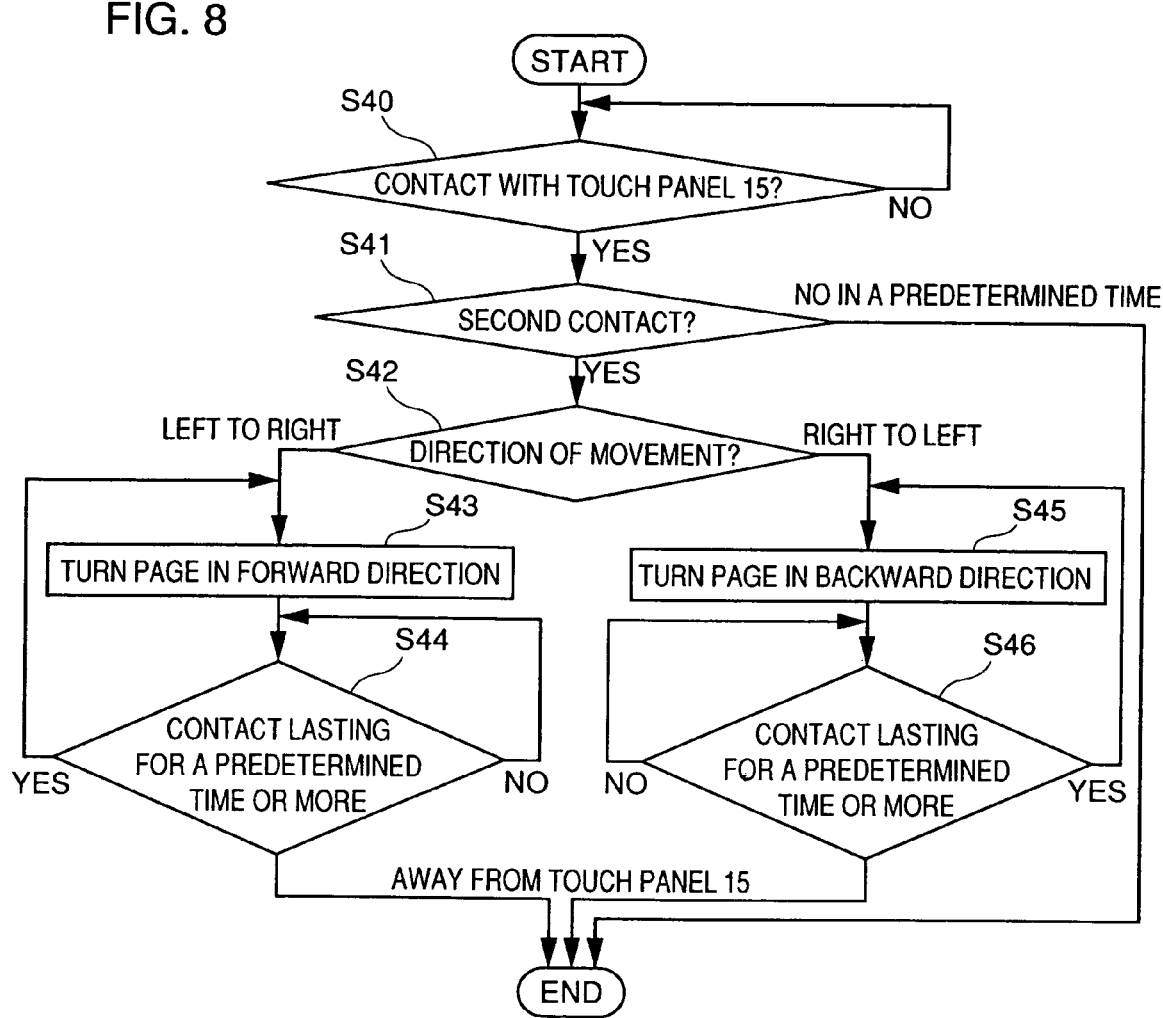

Referring to FIG. 8, display control unit 12 may control turning of a page as described below. According to the example of the process illustrated in FIG. 7, the user designates the forward or backward direction by touching panel 15 with a pointer and moving the pointer being in contact with the touch panel 15. According to an example of the process illustrated in FIG. 8, the forward or backward direction is designated by moving a pointer without making the pointer contact the touch panel 15.

Display control unit 12 determines if touch panel 15 detects contact with a pointer (S40). If touch panel 15 does not detect contact with the pointer (NO in S40), display control unit 12 repeats the process in S40 until touch panel 15 detects contact with the pointer.

When touch panel 15 detects contact with the pointer (YES in S40), display control unit 12 records the position of the contact and determines if there is the second contact between touch panel 15 and the pointer (S41). If there is no second contact in a predetermined time or more (NO IN A PREDETERMINED TIME in S41), the process by display control unit 12 is completed.

When touch panel 15 detects the second contact with the pointer (YES in S41), display control unit 12 calculates the direction in which the pointer moves, based on the difference between the first and second contact positions to determine the direction of movement (S42). If the pointer moves from left to right (LEFT TO RIGHT in S42), display control unit 12 turns a page in the forward direction (S43). After this, display control unit 12 determines if the contact between the pointer and touch panel 15 lasts for a predetermined time or more (S44). If the time of contact between the pointer and touch panel 15 is less than the predetermined time (NO in S44), display control unit 12 again performs the process in S44. If the contact between the pointer and touch panel 15 lasts for at least the predetermined time (YES in S44), display control unit 12 turns a page again in the forward direction (S43). When the pointer leaves touch panel 15 (AWAY FROM TOUCH PANEL 15 in S44), the process by display control unit 12 is completed.

If the pointer moves from right to left (RIGHT TO LEFT in S42), display control unit 12 turns a page in the backward direction (S45). After this, display control unit 12 determines if the contact between the pointer and touch panel 15 lasts for a predetermined time or more (S46). If the time of contact between the pointer and touch panel 15 is less than the predetermined time (NO in S46), display control unit 12 again performs the process in S46. If the time of contact between the pointer and touch panel 15 lasts for at least the predetermined time (YES in S46), display control unit 12 turns a page again in the backward direction (S45). When the pointer leaves touch panel 15 (AWAY FROM TOUCH PANEL 15 in S46), the process by display control unit 12 is completed.

When display device 11 having the two-screen structure as shown in FIG. 6 is employed, the first and second contacts between the pointer and touch panel 15 may be effected on the same touch panel 15. Alternatively, the pointer may be in the first contact with the left touch panel 15 and then be in the second contact with the right touch panel 15. By such an operation, a user can turn a page in a feeling as if the user turns a page of a book made of sheets of paper.

If the position of the first contact is extremely close to the position of the second contact, specifically the distance between the two contact positions is 10 mm or less, for example, display control unit 12 may determine that the user moves the pointer while allowing the pointer to be in contact with touch panel 15, and perform the page turn process according to the flowchart shown in FIG. 7.

Figure 9:
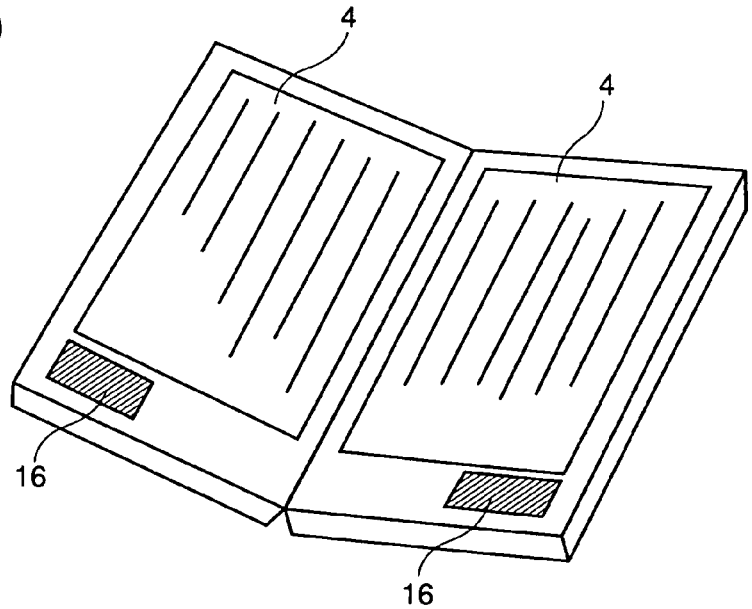
FIG. 9 shows an exterior of a display device having a touch position sensor.

Referring to FIG. 9, instead of touch panel 15, a contact position sensor 16 may be used which is employed these days as a pointing device for a notebook-sized personal computer. In this case, contact position sensor 16 is arranged separately from a flat display 14.

Figure 10:
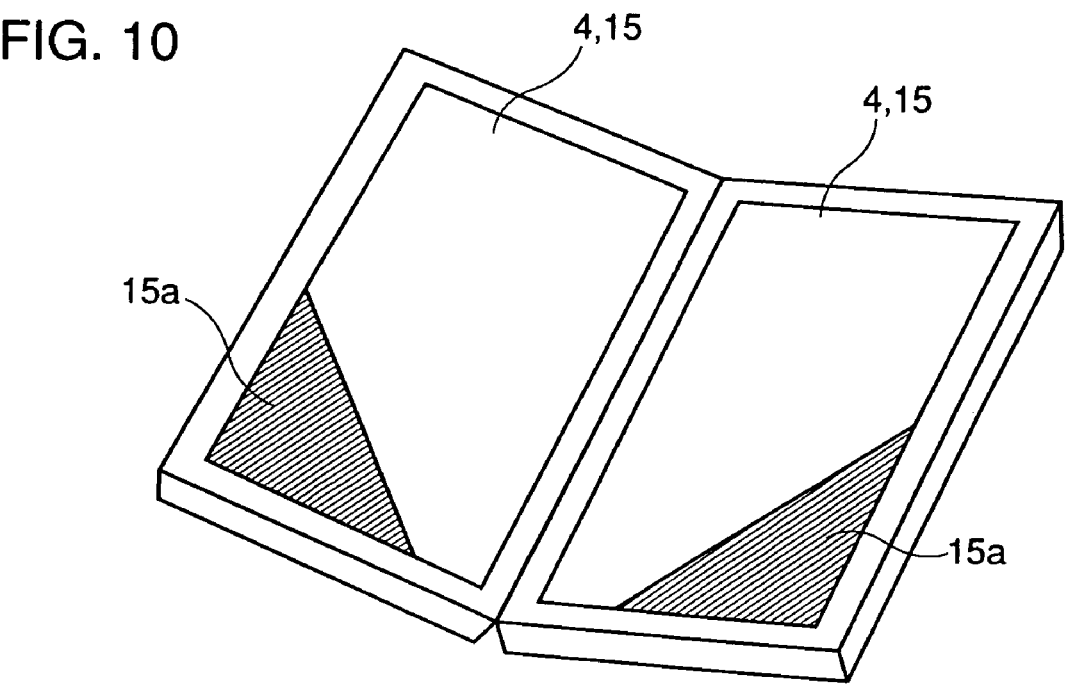
FIG. 10 illustrates a page turn effective region of a touch panel.

Referring to FIG. 10, a touch panel 15 may have a part thereof as a page turn effective region 15a and a user may give a page turn instruction by page turn effective region 15a only. In this way, an erroneous operation due to an accidental contact by a finger can be prevented. Although the shape of page turn effective region 15a is a triangle in FIG. 10, the shape is not limited thereto and may be another polygon, arc, circle or the like. In addition, the location of page turn effective region 15a is not limited to the lower left corner and the lower right corner, and may be in the band-shaped region corresponding to one-third at the bottom of the touch panel.

As heretofore described, the user can change a page by the touch with the pointer or moving the pointer. The user can thus turn a page in a feeling as if the user actually turns a page of a book made of sheets of paper.

The number of pages to be turned varies depending on the time period of contact between the pointer and touch panel 15. Accordingly, the same operation allows pages to be turned one by one and turned successively.

Further, arrangement of page turn effective region 15a can prevent an erroneous operation caused by an accidental contact by the pointer.

Third Embodiment

Figure 11:
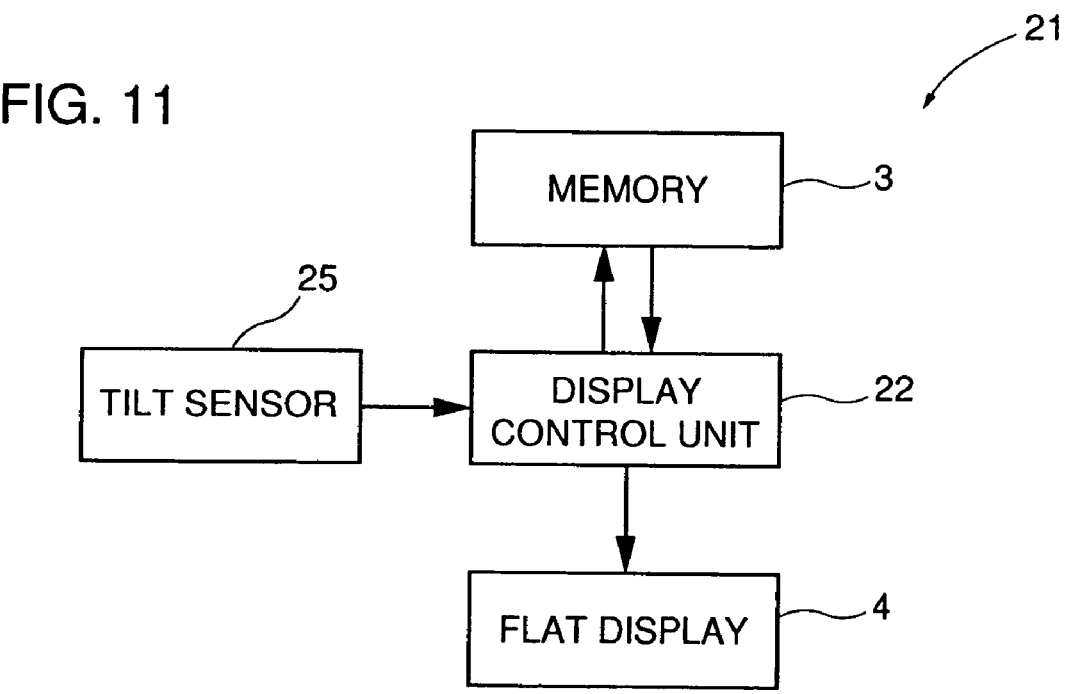
FIG. 11 is a block diagram showing a structure of a display device according to a third embodiment.

Referring to FIG. 11, a display device 21 according to the third embodiment includes a memory 3 similar to that in the first embodiment, a flat display 4 similar to that in the first embodiment, a display control unit 22 for controlling reading of image information, character information and the like stored in memory 3 and displaying of the read information on flat display 4, and a tilt sensor 25 for issuing an instruction to turn a page to display control unit 22.

Figure 12:
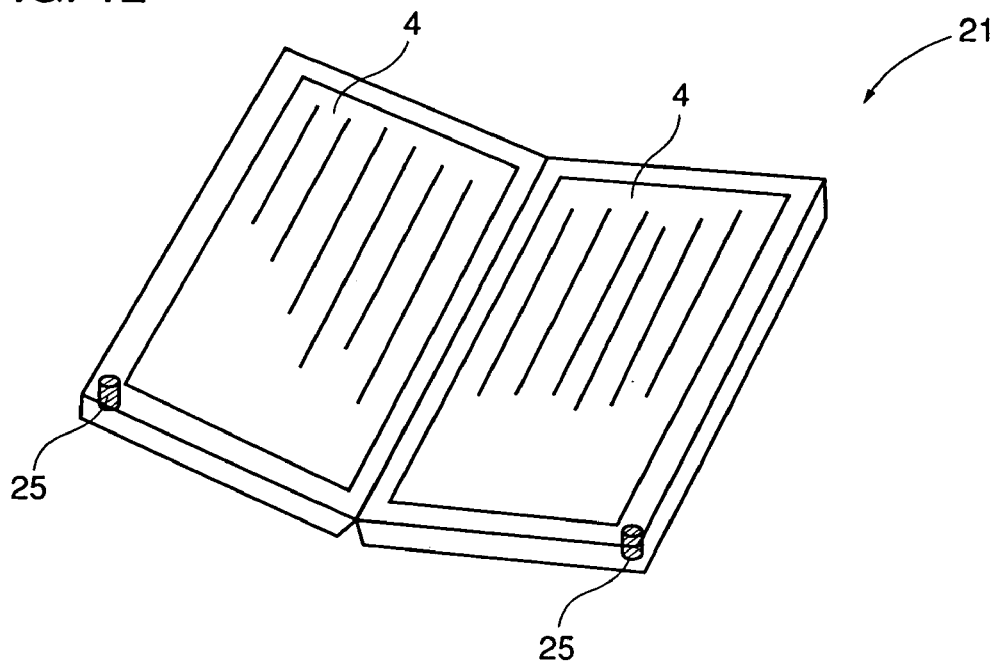
FIG. 12 shows an exterior of the display device according to the third embodiment.

Referring to FIG. 12, display device 21 according to the third embodiment includes two flat displays 4 and two tilt sensors 25, and the two sets of flat displays 4 and tilt sensors 25 are arranged to face each other. Display control unit 22 and memory 3 are arranged within the display device. The position of tilt sensor 25 is not limited to the one shown in FIG. 12. However, in consideration of characteristics of tilt sensor 25, the sensor may be placed as far as possible from the axis of rotation of flat display 4.

Figure 13:
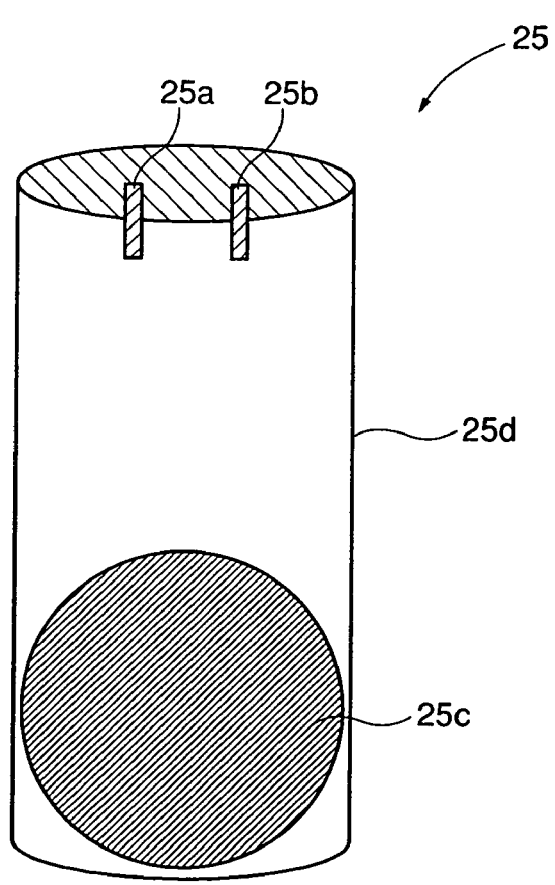
FIG. 13 shows a structure of a tilt sensor.

Referring to FIG. 13, tilt sensor 25 includes a hollow cylinder 25d, a conductive ball 25c housed within cylinder 25d, and electrodes 25a and 25b arranged on the upper part of cylinder 25d. When tilt sensor 25 is in a normal state (OFF state), ball 25c is located in the lower part of cylinder 25d, and ball 25c and electrodes 25a and 25b are not in contact as shown in FIG. 13. Rotation or tilt of the entire sensor causes ball 25c to move in cylinder 25d and touch electrodes 25a and 25b arranged on the upper part of cylinder 25d. Consequently, current flows between electrodes 25a and 25b and tilt of tilt sensor 25 is thus detected (ON state).

It is supposed here that tilt sensors 25 on the right and left sides are in the OFF state when display device 21 is being opened as shown in FIG. 12. If one of flat displays 4 is fixed while the other flat display 4 is closed and then opened again, one of tilt sensors 25 enters ON state. Then, display control unit 22 can detect which of the right and left flat displays 4 is opened and closed.

Figure 14:
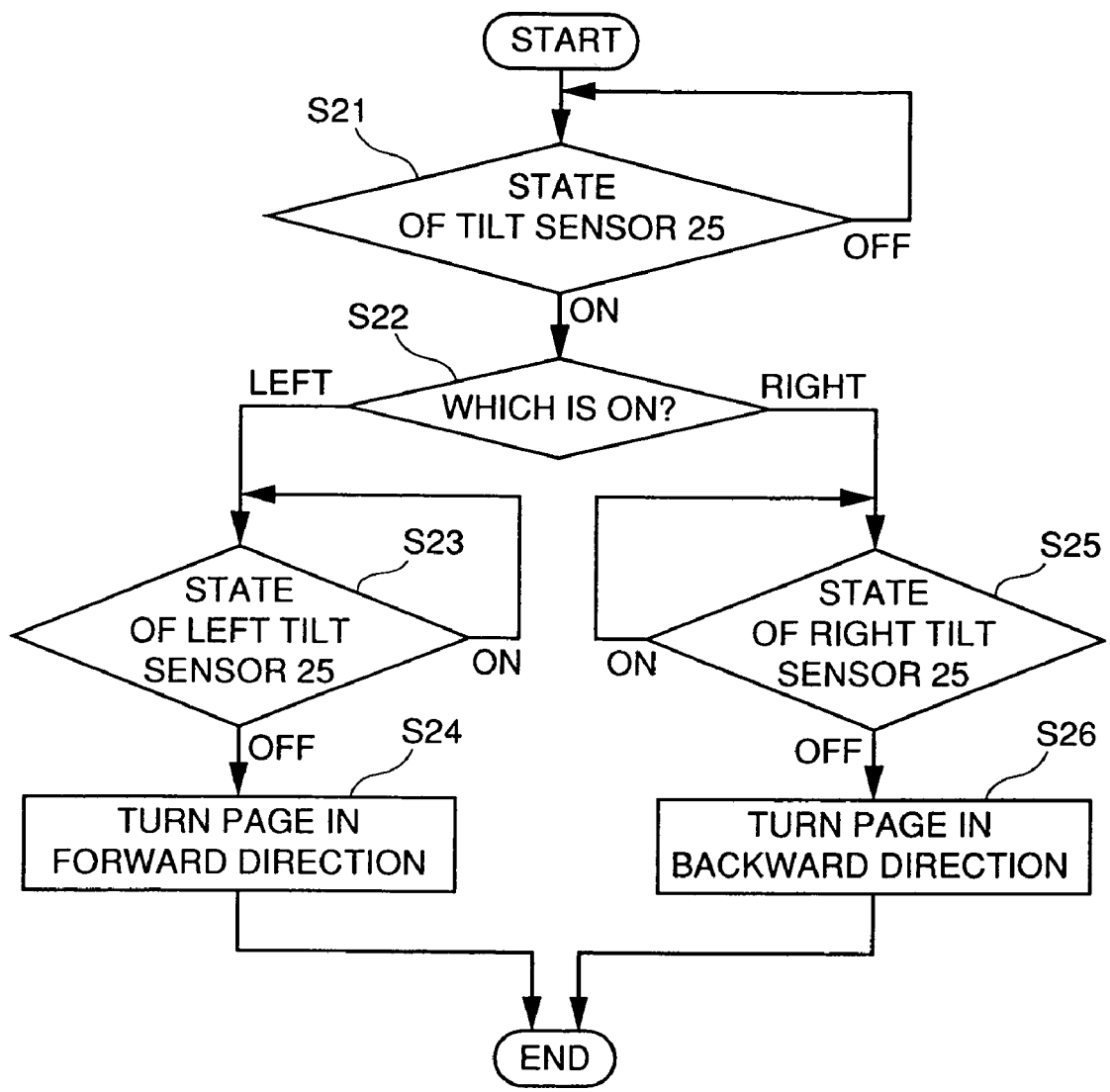
FIG. 14 is a flowchart showing a page turning process.

Referring to FIG. 14, a page turn control process by display control unit 22 is described. It is supposed in the process shown in FIG. 14 that a book referred to here has a vertical writing with a page of a smaller number displayed on the right flat display 4.

Display control unit 22 waits until tilt sensor 25 enters the ON state (S21). When the state of tilt sensor 25 becomes ON (ON in S21), display control unit 22 determines which of the right and left tilt sensors 25 is ON (S22). If the left tilt sensor 25 is ON (LEFT in S22), display control unit 22 waits until the left tilt sensor 25 becomes OFF (S23). When the left tilt sensor 25 becomes OFF (OFF in S23), display control unit 22 controls to turn a page in the forward direction.

If the right tilt sensor 25 becomes ON (RIGHT in S23), display control unit 22 waits until the right tilt sensor 25 becomes OFF (S25). When the right tilt sensor 25 becomes OFF (OFF in S25), display control unit 22 controls to turn a page in the backward direction.

The user can accordingly turn a page by opening and closing display device 21. Thus, the user can turn a page while holding display device 21 without shifting a hand or finger to a button.

Fourth Embodiment

Figure 15:
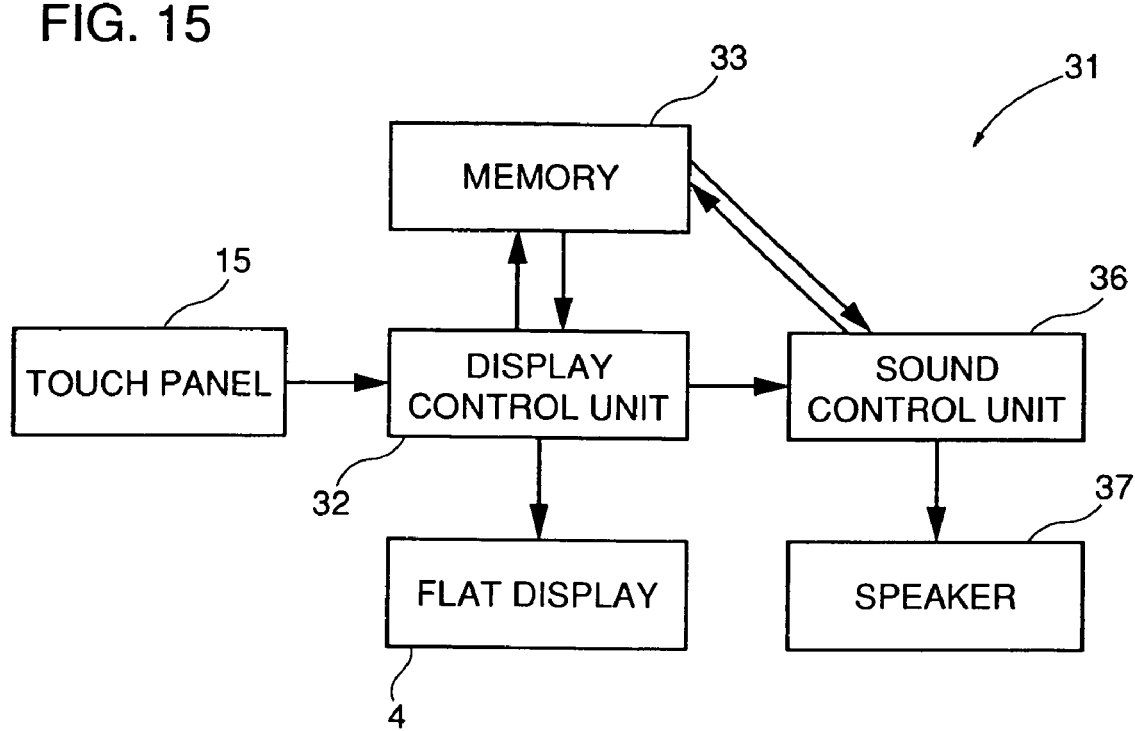
FIG. 15 is a block diagram showing a structure of a display device according to a fourth embodiment.

Referring to FIG. 15, a display device 31 according to the fourth embodiment includes a memory 33 constructed of a magnetic memory device such as hard disk and MO for storing image information, character information, sound information and the like, a flat display 4 similar to that in the first embodiment, a display control unit 32 for controlling reading of image information, character information and the like stored in memory 33 and displaying thereof on flat display 4, a touch panel 15 similar to that in the second embodiment, and a sound control unit 36 reading sound information from memory 33 to output a sound of turning a sheet of paper through a speaker 37 when display control unit 32 turns a page having information displayed on flat display 4. Sound control unit 36 outputs different sounds depending on the speed of turning a page.

Figure 16:
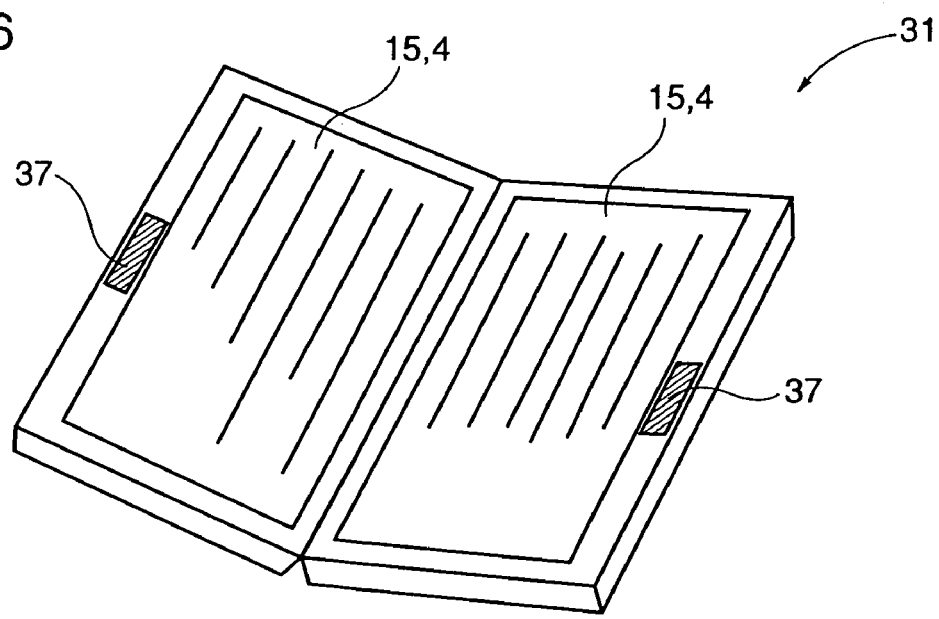
FIG. 16 shows an exterior of the display device according to the fourth embodiment.

Referring to FIG. 16, display device 31 according to the fourth embodiment includes two flat displays 4 and two touch panels 15. The two sets of flat displays 4 and touch panels 15 are arranged to face each other. Further, two speakers 37 are arranged respectively on the right and left sides of display device 31. Display control unit 32, sound control unit 36 and memory 33 are arranged within display device 31. Instead of touch panel 15, a usual switch or the like may be used.

Display control unit 32 controls turning of a page in a similar manner to that of display control unit 12 of display device 11 according to the second embodiment described in conjunction with FIGS. 7 and 8. Therefore, description of the control is not repeated here. Display control unit 32 supplies to sound control unit 36, information from touch panel 15 regarding contact between a pointer and touch panel 15.

Figure 17:
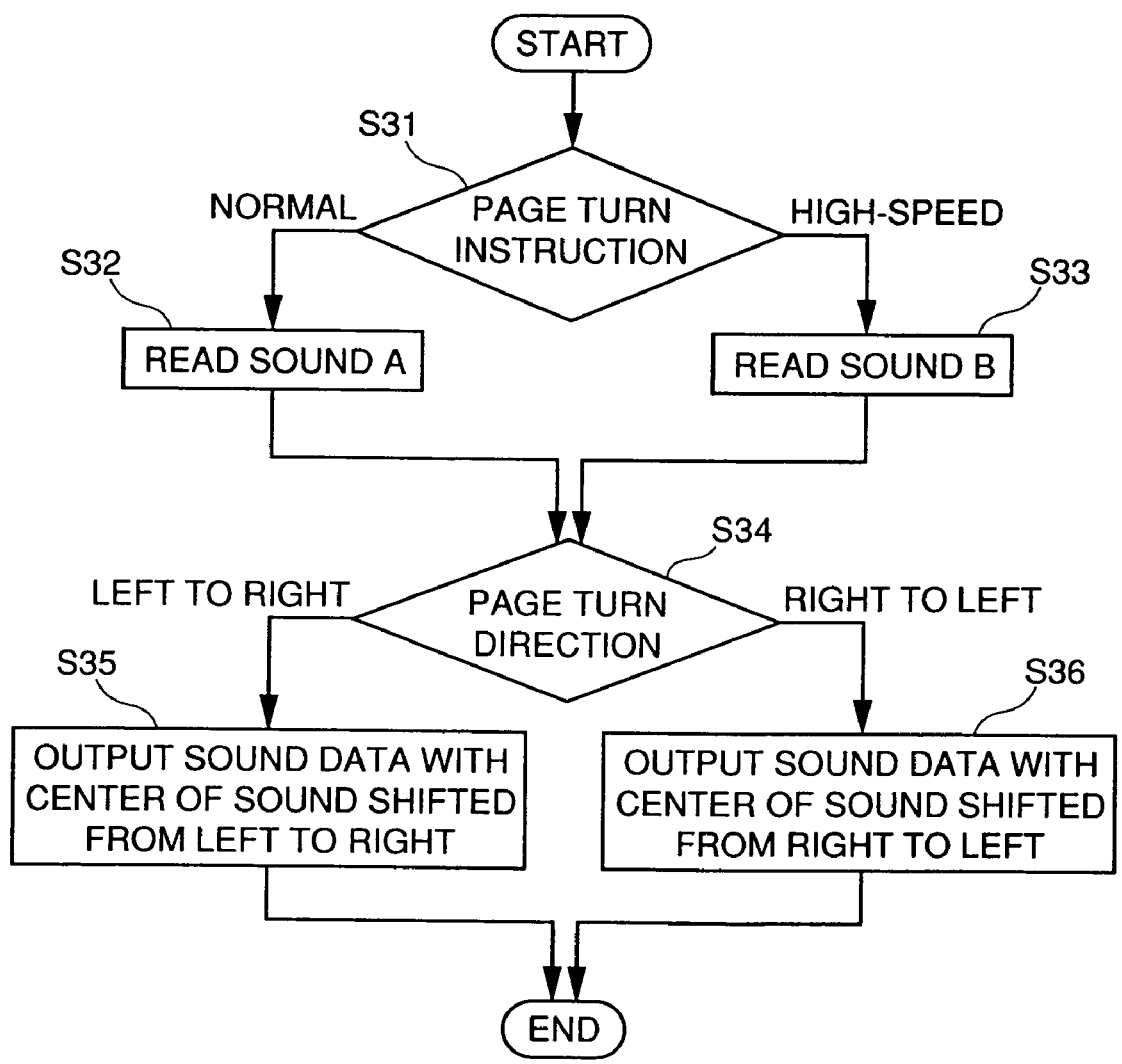
FIG. 17 is a flowchart showing a sound output process.

Referring to FIG. 17, a process of sound output control by sound control unit 36 is described. Sound control unit 36 determines if an instruction by touch panel 15 to turn a page means a normal turn or a high-speed turn (S31). The normal turn refers to turning of one page only and the high-speed turn refers to turning of pages successively or turning of several pages as a unit at a time. If the page turn instruction refers to the normal turn (NORMAL in S31), sound control unit 36 reads a sound pattern A from memory 33 (S32). If the page turn instruction refers to the high-speed turn (HIGH-SPEED in S31), sound control unit 36 reads a sound pattern B from memory 33 (S33). The sound pattern A generates a sound of turning a sheet of paper slowly and the sound pattern B generates a sound of flicking and skipping through pages.

After the process in S32 or S33, sound control unit 36 determines in which direction a page is to be turned (S34). If the direction of turning a page is from left to right (LEFT TO RIGHT in S34), the sound data read in the process of S32 or S33 is output with the center of the sound being shifted from left to right (S35). If the direction of turning a page is from right to left (RIGHT TO LEFT in S34), the sound data read in the process of S32 or S33 is output with the center of the sound being shifted from right to left (S36). Here, to shift the center of sound from left to right refers to an operation of outputting the sound such that the volume of the sound from the left speaker 37 is made greater at first and then the volume of the left speaker 37 is gradually decreased while the volume of the right speaker 37 is increased. To shift the center of sound from right to left refers to an operation in an adverse manner.

As heretofore discussed, display device 31 outputs the sound of turning a sheet of paper simultaneously with the page turning operation and outputs different sounds according to the number of pages to be turned. In this way, a user can turn a page in a feeling as if the user turns a sheet of paper.

Further, display device 31 changes the balance of the output sounds according to the direction of turning a page. Accordingly, the user can turn a page in a feeling as if the user actually turn a page.

Fifth Embodiment

Figure 18:
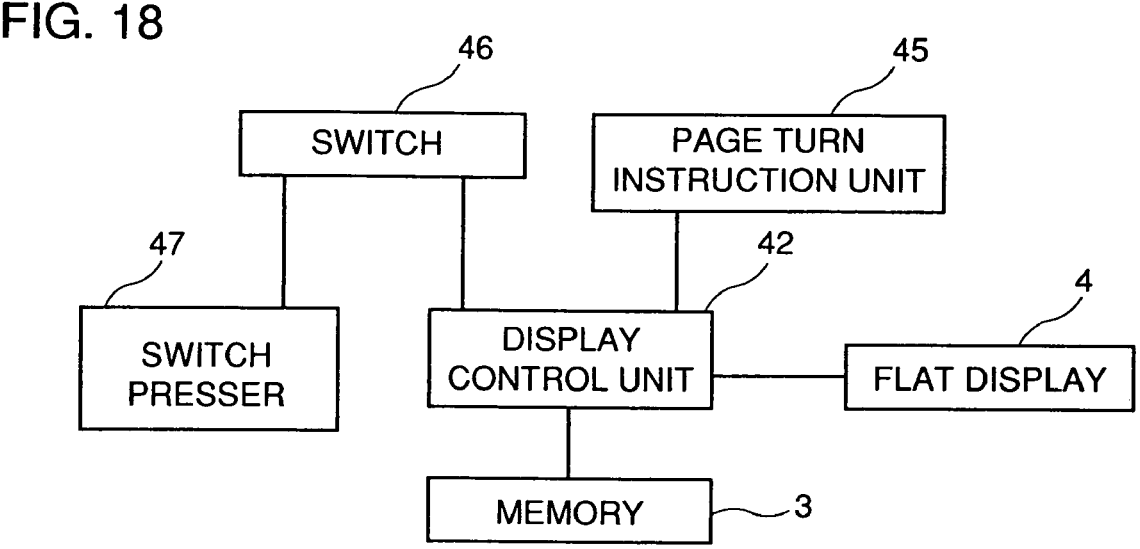
FIG. 18 is a block diagram showing a structure of a display device according to a fifth embodiment.

Referring to FIG. 18, a display device according to the fifth embodiment includes a memory 3, a flat display 4, a switch 46 for detecting the degree of opening (angle of rotation) of flat display 4, a switch presser 47 serving to press switch 46, a display control unit 42 for controlling reading of image information, character information and the like stored in memory 3 and displaying thereof on flat display 4 and controlling display/non-display of flat display 4 according to the state of switch 46, and a page turn instruction unit 45 for receiving an instruction to turn a page from a user to issue a page turn instruction to display control unit 42. The display device further includes a display buffer (not shown) for holding data to be displayed on flat display 4.

Figure 19:
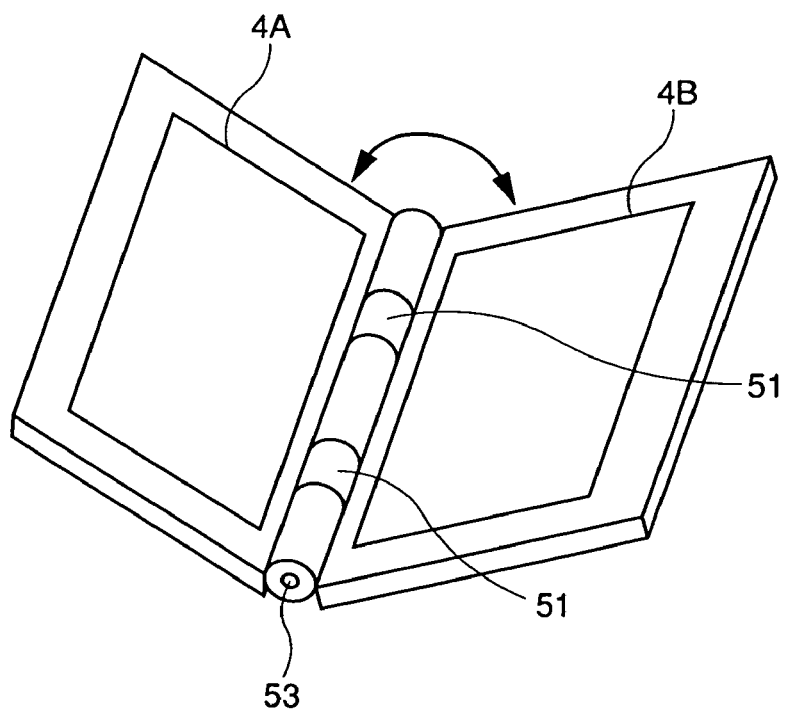
FIG. 19 shows an exterior of the display device according to the fifth embodiment.

Referring to FIG. 19, the display device has two flat displays 4A and 4B. Two flat displays 4A and 4B are connected via a joint 51 such that displays 4A and 4B can rotate about an axis of rotation 53 corresponding to the portion of a book where pages are bound. If no particular notice is given here, flat displays 4A and 4B are powered to display page data thereon.

Figure 20:
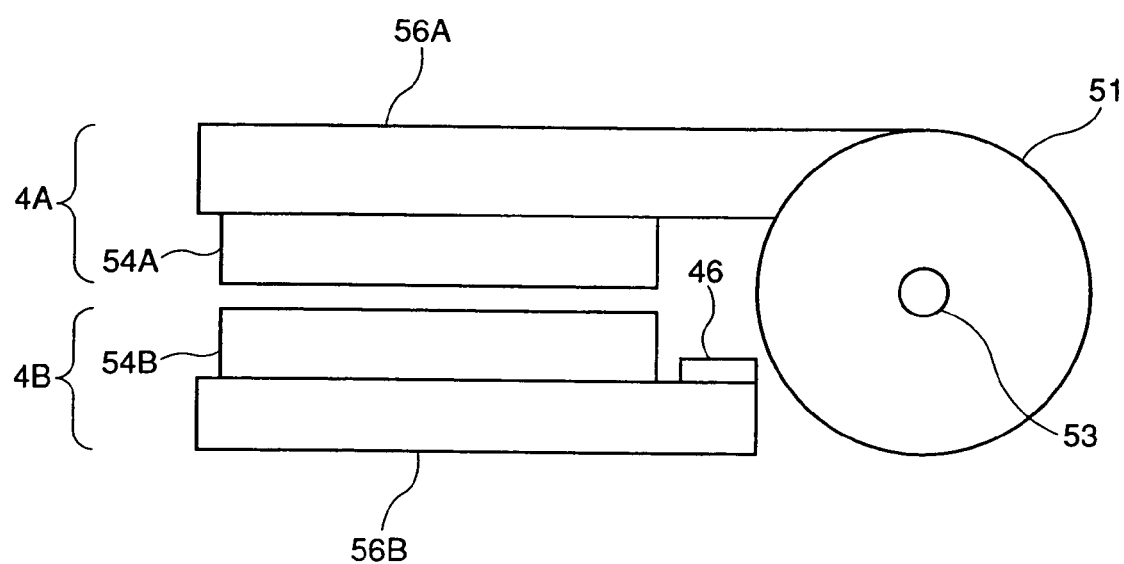
FIG. 20 laterally shows the display device.

Referring to FIG. 20, flat display 4A includes a base plate 56A and a display surface 54A formed on base plate 56A. Flat display 4B includes a base plate 56B and a display surface 54B formed on base plate 56B. Switch 46 is provided on base plate 56B. Base plate 56A is connected to joint 51 to be rotatable about axis of rotation 53. The top of switch 46 is pressed to cause ON state of switch 46 and the switch 46 is in OFF state if no pressure is applied to the switch. In FIG. 20, the angle of rotation of flat display 4 shown is 0°.

Figure 21:
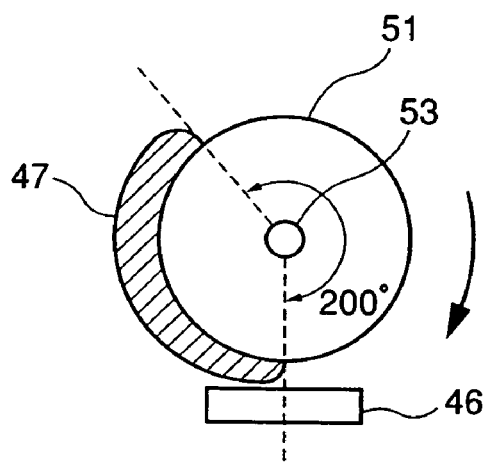
FIG. 21 shows a structure of a switch and a switch presser.

Referring to FIG. 21, switch presser 47 is formed around joint 51. When joint 51 rotates (clockwise) in the direction of the arrow in FIG. 21, switch presser 47 and switch 46 are brought into contact with each other when the angle ranges from 200° to 360° so that switch presser 47 presses switch 46. It is noted that the angle of 200° allows flat display 4A to be confirmed as being turned toward the back of flat display 4B. The angle of 360° means that flat displays 4A and 4B are arranged back to back.

Although flat displays 4A and 4B can rotate relatively to each other, flat display 4B is described here as being placed horizontally while flat display 4A is rotated for the purpose of convenience.

Figure 22:
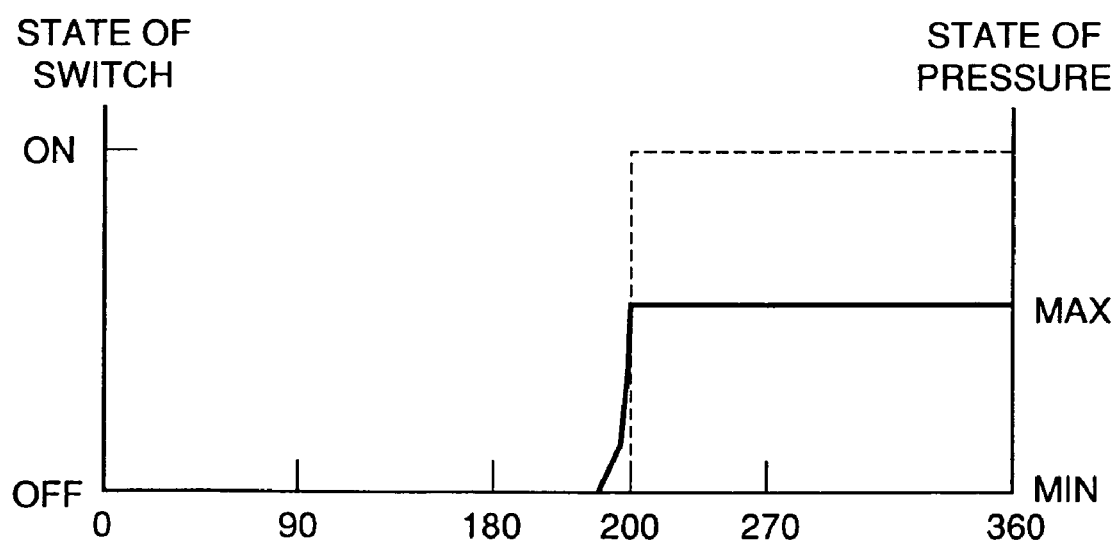
FIG. 22 shows pressure applied to the switch in FIG. 21 and a state of the switch.

Referring to FIG. 22, a relation between the angle of rotation of joint 51 and pressure applied to switch 46 is shown by the solid line. The pressure can be digitized based on a predetermined threshold to obtain the relation represented by the broken line. Then, the state of switch 46 (ON or OFF state) can be determined.

Display control unit 42 causes one of flat displays 4A and 4B not to provide display when switch 46 is in the ON state.

Figure 23:
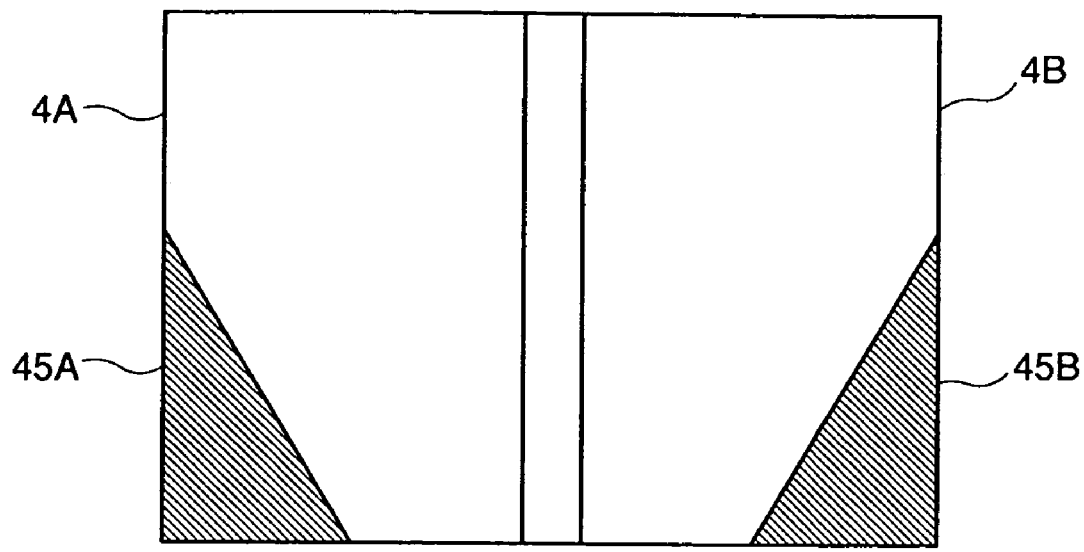
FIG. 23 illustrates a page turn instruction unit.

Referring to FIG. 23, page turn instruction unit 45 consists of page turn instruction units 45A and 45B embedded respectively in flat displays 4A and 4B. Page turn instruction units 45A and 45B are formed of tablet devices (touch panels). Page turn instruction units 45A and 45B each corresponding to a triangular region formed at the location corresponding to the home position of a finger for turning a page of a pocketbook held in hand.

When a user moves the user's finger from left to right in this region while allowing the finger to touch the region, page turn instruction unit 45 outputs a signal for turning a page in the forward direction. Display control unit 42 receives this signal to read page data of the next page from memory 3 so as to accomplish the forward page turning and updates displays on flat displays 4A and 4B. When the user moves the finger in the reverse direction, page turn instruction unit 45 outputs a signal for turning a page in the backward direction. Display control unit 42 receives this signal to read page data of the previous page from memory 3 to accomplish the backward page turning and updates displays on flat displays 4A and 4B.

The direction in which the finger moves can be detected by tracking the position of contact with respect to time. Page turn instruction unit 45 may be formed over the entire surface of flat displays 4A and 4B. However, page turn instruction unit 45 can be formed in a specified region of flat displays 4A and 4B as shown in FIG. 23 in order to avoid an erroneous operation due to touch by a finger or the like.

Display control unit 42 may turn two pages at a time when both of the flat displays 4A and 4B are in the display state and turn one page at a time when only one of the flat displays 4A and 4B is in the display state. In this case, if the display buffer mentioned above can store data corresponding to two pages, display control unit 42 reads from memory 3 data of two pages at a time and writes the data into the display buffer. If the above display buffer can store data corresponding to one page only, display control unit 42 reads from memory 3 data of one page at a time and writes the data into the display buffer.

If one of flat displays 4A and 4B which have given displays ceases to provide its display, display control unit 42 may compress data corresponding to two pages being displayed currently into data of one page, and rewrite contents of the display buffer in order to display the compressed page data on flat display 4A or 4B which is in the display state. Page compression is a well-known technique. For example, if the display information is text information only, page compression can be achieved by decreasing the size of character font. If the display information is image data, page compression can be implemented by thinning out the data.

The compression of page data to be displayed may be done only when one of the flat displays 4A and 4B which have given displays stops providing display. After this, when a page turn instruction is issued, display control unit 42 does not compress data and turns pages one by one.

As shown in FIG. 23, since page turn instruction units 45A and 45B are arranged symmetrically, a page can be turned conveniently whether the display device is held in right hand or in left hand, or held by a right-handed person or left-handed person.

Variation of Switch Presser 47

Figure 24:
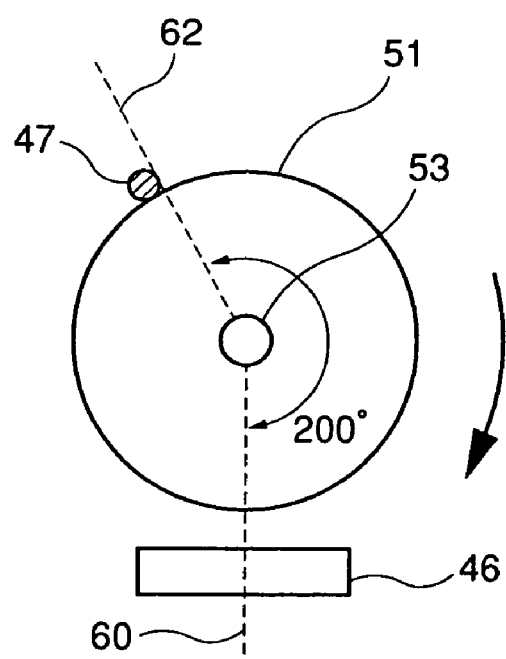
FIG. 24 shows a structure of a switch and a switch presser.

Referring to FIG. 24, switch presser 47 may be provided only at a location corresponding to the angle of rotation of approximately 200° of joint 51.

Figure 25:
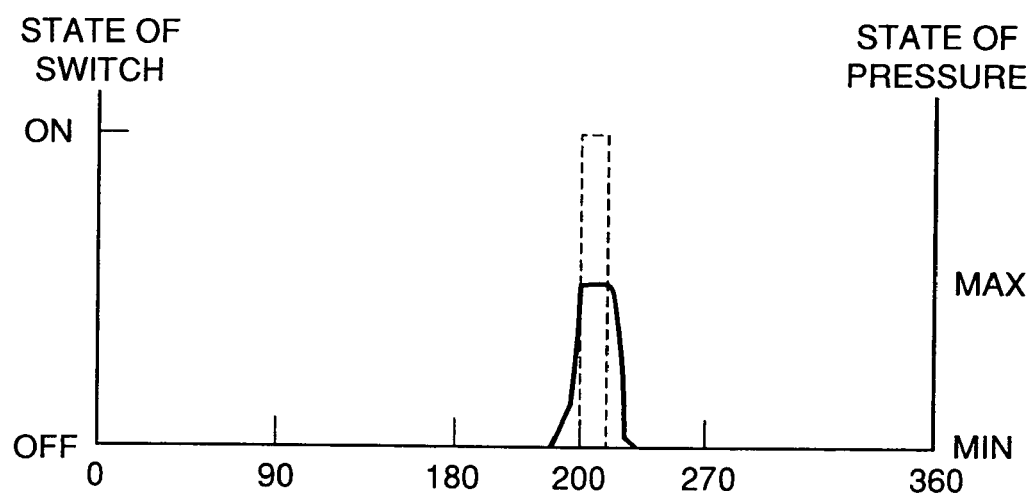
FIG. 25 shows pressure applied to the switch in FIG. 24 and a state of the switch.
Figure 26:
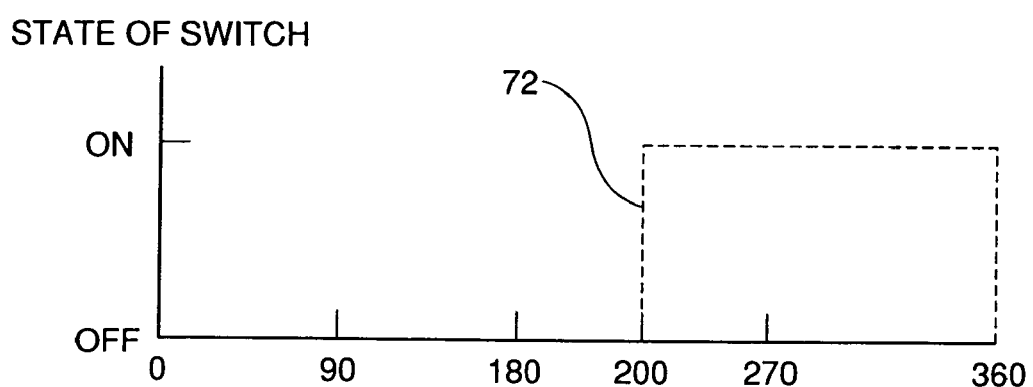
FIG. 26 shows a state of the switch generated by shaping the state of the switch in FIG. 25.

Referring to FIG. 25, a relation is shown by the solid line between an angle of rotation of joint 51 and pressure applied to switch 46. This pressure can be digitized based on a predetermined threshold to obtain the relation represented by the broken line and thus the state of switch 46 (ON state or OFF state) can be determined. Referring to FIG. 26, switch 46 further includes a circuit for shaping the signal represented by the broken line in FIG. 25 and accordingly outputs a signal which becomes ON state when switch 46 is at an angle ranging from 200° to 360°. This circuit provides an ON output when the rotational angle of joint 51 changes from an angle smaller than 200° to an angle greater than 200°, which corresponds to rise of the signal represented by the broken line in FIG. 25 and provides an OFF output when the rotational angle of joint 51 changes from an angle greater than 200° to an angle smaller than 200°, which corresponds to fall of the signal represented by the broken line in FIG. 25. Such a circuit can easily be constructed by a well-known flip-flop circuit.

First Variation of Page Turn Instruction Unit 45

Figure 27:
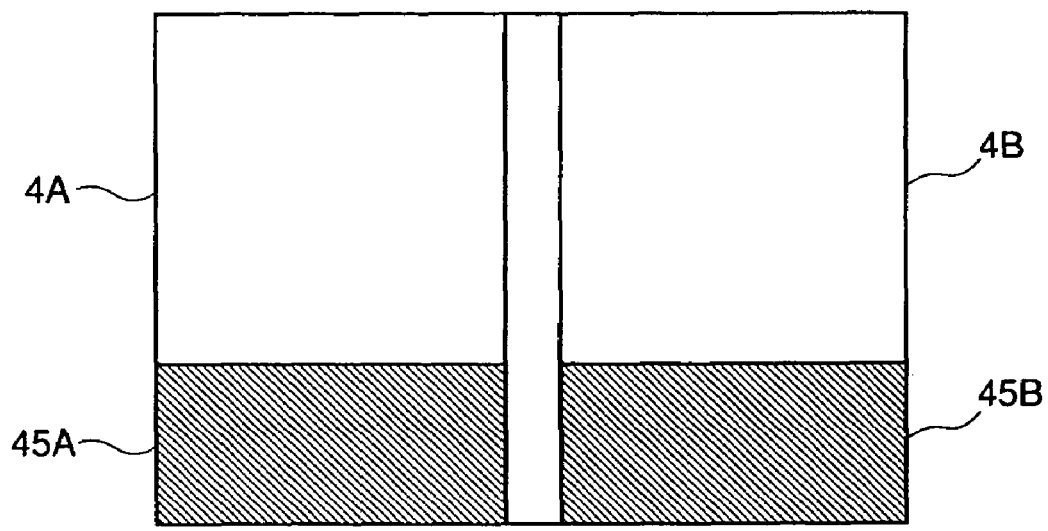
FIGS. 27 and 28 illustrate a page turn instruction unit.

Referring to FIG. 27, a page turn instruction unit 45 may be provided in a region corresponding to approximately one-fourth at the bottom of flat displays 4A and 4B.

Second Variation of Page Turn Instruction Unit 45

Figure 28:
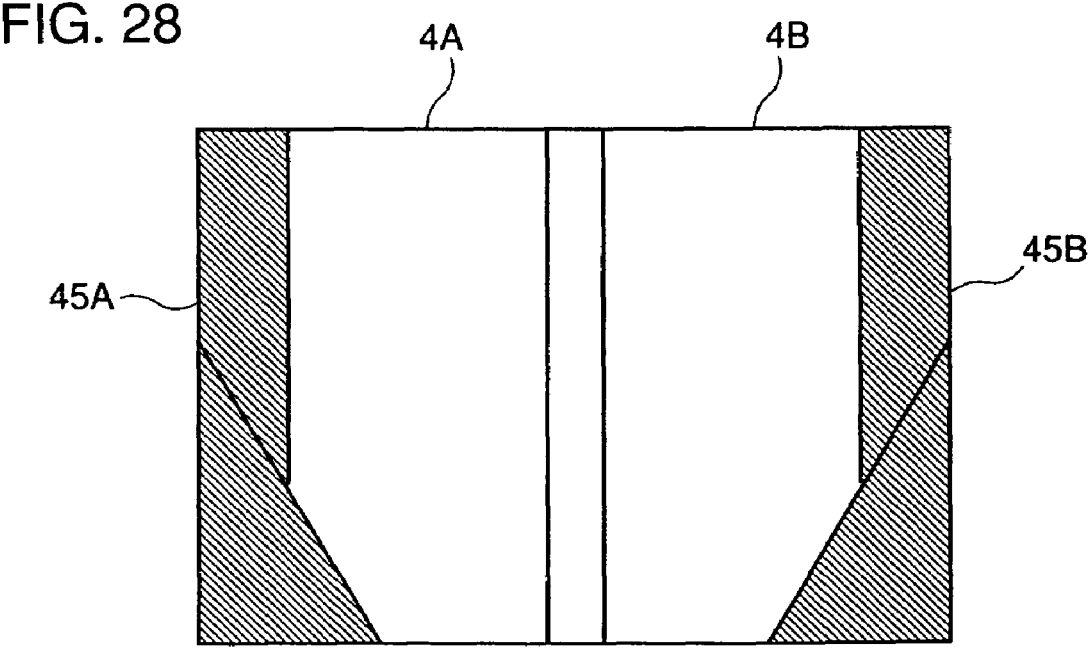

Referring to FIG. 28, a page turn instruction unit 45 may be provided in regions on both sides of flat displays 4A and 4B and triangular regions similar to those in FIG. 23.

The display device as described above has flat displays 4A and 4B which can be opened freely by a user at an angle ranging from 0° to 360°. The user can thus watch flat displays 4A and 4B even if the area occupied by the display device is decreased. In this way, a display device superior in portability can be provided.

In addition, this display device has flat displays 4A and 4B which can be folded back to back. A resultant advantage is that the user can support the display device in one hand even if flat displays 4A and 4B have a large display area.

Further, this display device having flat displays 4A and 4B folded back to back allows only one of the flat displays 4A and 4B to give display and the other display 4A or 4B not to give display. Consequently, page data is never glanced furtively by others even in the crowd in a railroad car, for example. Accordingly, a display device superior in prevention of information leakage can be provided. There is also an effect in reduction of power consumption.

Further, page turn instruction units 45A and 45B are arranged at locations corresponding to the home position of a finger when the display device is held in one hand. The user can thus turn a page of the display device with one hand.

Page turn instruction units 45A and 45B are arranged symmetrically. Therefore, the user can turn a page conveniently whether the user holds the display device in right hand or left hand. In addition, whether the user is right-handed or left-handed, the user can similarly turn a page conveniently.

Sixth Embodiment

Figure 29:
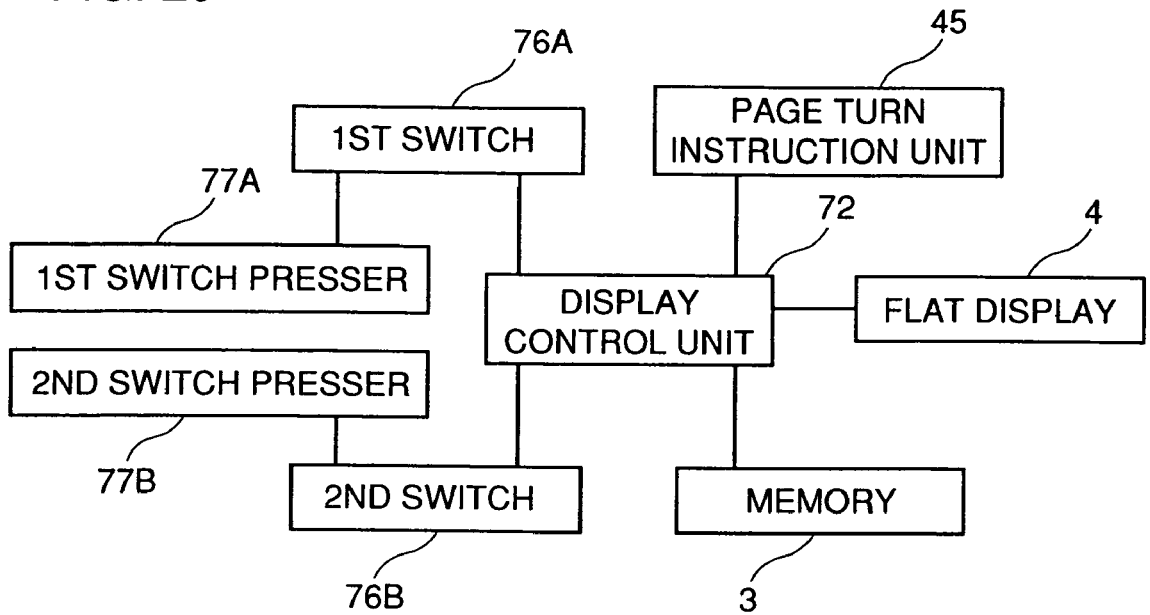
FIG. 29 is a block diagram showing a structure of a display device according to a sixth embodiment.

Referring to FIG. 29, a display device according to the sixth embodiment includes a memory 3, a flat display 4, first and second switches 76A and 76B for detecting the degree of opening (angle of rotation) of flat display 4, first and second switch pressers 77A and 77B serving to press the first and second switches 76A and 76B respectively, a display control unit 72 for controlling reading of image information, character information and the like stored in memory 3 and controlling whether flat display 4 gives display or not, and a page turn instruction unit 45.

Figure 30:
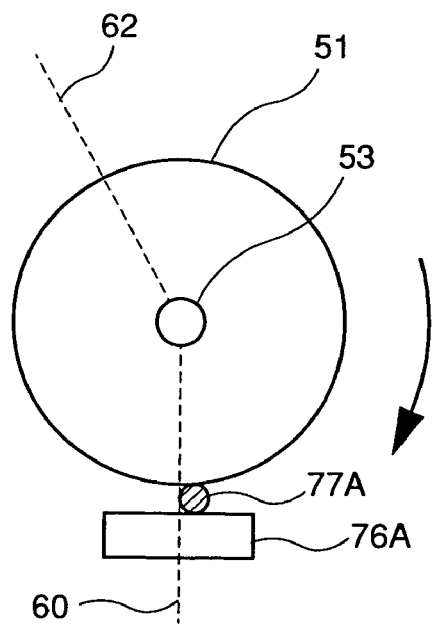
FIG. 30 shows a structure of a first switch and a first switch presser.

Referring to FIG. 30, the first switch presser 77A is provided at an angle of rotation of approximately 0° of joint 51 in FIG. 19. Referring to FIG. 31A, the first switch 76A changes to ON state when the rotational angle of joint 51 exceeds 0°.

The second switch presser 77B and the second switch 7B are structured similarly to switch presser 47 and switch 46 described in conjunction with FIG. 24. Therefore, the description of these components is not repeated here. Referring to FIG. 31B, the second switch 76B becomes ON state when the rotational angle of joint 51 is in the range from 200° to 360°.

Referring to FIG. 32, display control unit 72 receives outputs of the first and second switches 76A and 76B to control display/non-display of flat displays 4A and 4B. When both of the first and second switches 76A and 76B are in the ON state, that is, the rotational angle of joint 51 is 200° to 360°, display control unit 72 causes flat display 4A not to give display and causes flat display 4B to give display. When the first switch 76A is in the ON state and the second switch 76B is in the OFF state, that is, the rotational angle of joint 51 is 0° to 200°, display control unit 72 allows both of the flat displays 4A and 4B to provide display. When the first switch 76A is in the OFF state, that is, flat display 4 is closed, display control unit 72 causes both of the flat displays 4A and 4B not to provide display.

The display device as heretofore described can be effective similarly to the display device of the fifth embodiment.

Seventh Embodiment

Figure 33:
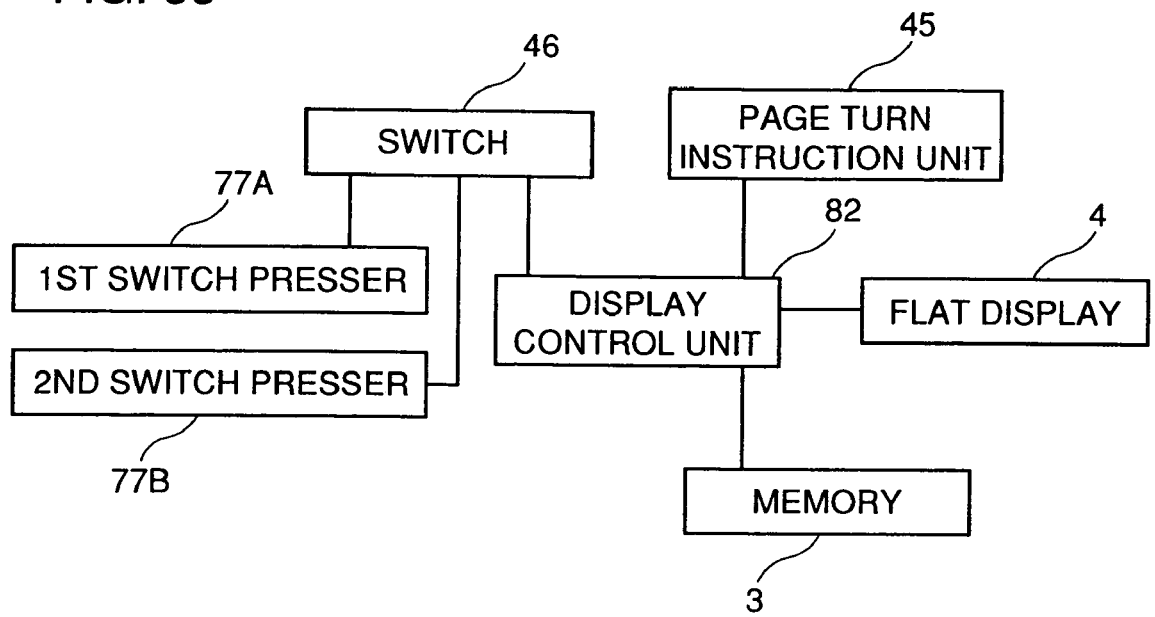
FIG. 33 is a block diagram showing a structure of a display device according to a seventh embodiment.

Referring to FIG. 33, a display device according to the seventh embodiment includes a memory 3, a flat display 4, a switch 46, first and second switch pressers 77A and 77B, and a page turn instruction unit 45.

Figure 34:
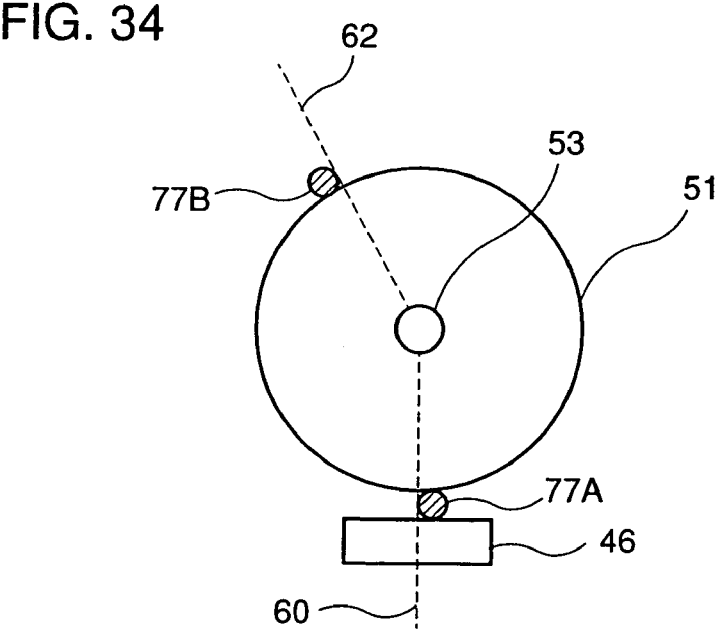
FIG. 34 shows a structure of a switch and first and second switch pressers.

Referring to FIG. 34, the first and second switch pressers 77A and 77B are provided respectively at the rotational angles of approximately 0° and 200° of a joint 51. Switch 46 provides outputs as shown in FIGS. 31A and 31B. Thus, display control unit 82 controls display/non-display of flat displays 4A and 4B similarly to display control unit 72 of the display device according to the sixth embodiment described in conjunction with FIG. 32.

The display device as described above can be effective similarly to the display device of the fifth embodiment.

Eighth Embodiment

Figure 35:
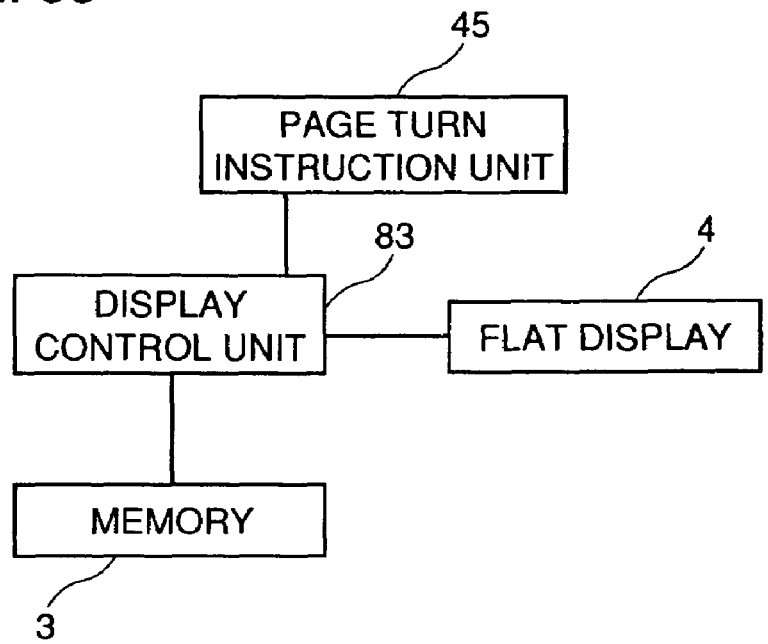
FIG. 35 is a block diagram showing a structure of a display device according to an eighth embodiment.

Referring to FIG. 35, a display device according to the eighth embodiment includes a memory 3, a flat display 4, a display control unit 83 for controlling reading of image information, character information and the like stored in memory 3 and controlling display/non-display of flat display 4, and a page turn instruction unit 45. A tablet device (not shown) of electrostatic coupling type, pressure sensitive type or display-integrated type is embedded in flat display 4. When a pointer such as finger touches the surface of flat display 4, a signal indicating the touched position is supplied to display control unit 83.

Figure 36:
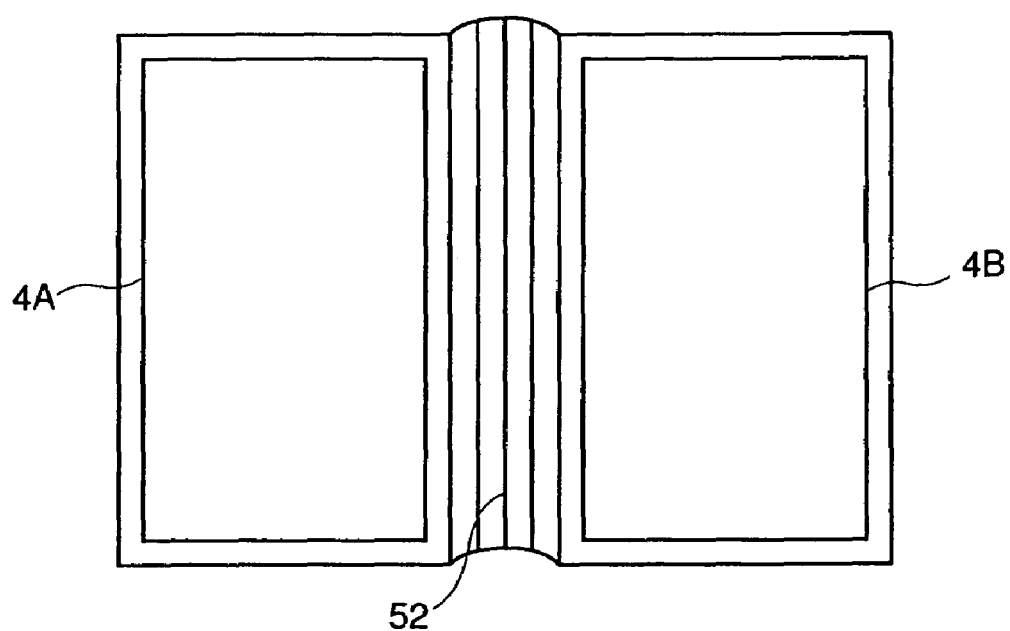
FIG. 36 shows an exterior of the display device according to the eighth embodiment.

Referring to FIG. 36, flat displays 4A and 4B are rotatably coupled by a hinge 52.

Figure 37A:
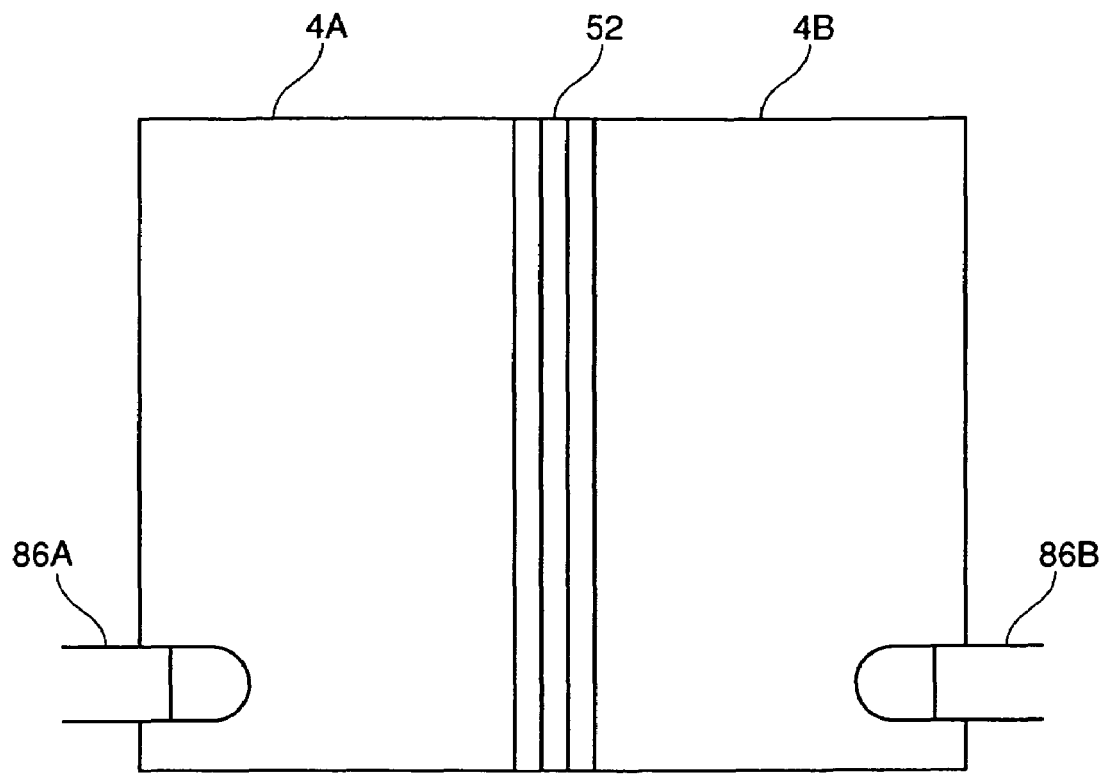
FIG. 37A shows an exterior of the display device which is opened.

FIG. 37A shows the display device being opened, with the thumb 86A of left hand touching flat display 4A and the thumb 86B of right hand touching flat display 4B. The display device is supported by the palm of the hand or other fingers. In this state, the areas of the fingers touching flat displays 4A and 4B are approximately equal to each other.

Figure 37B:
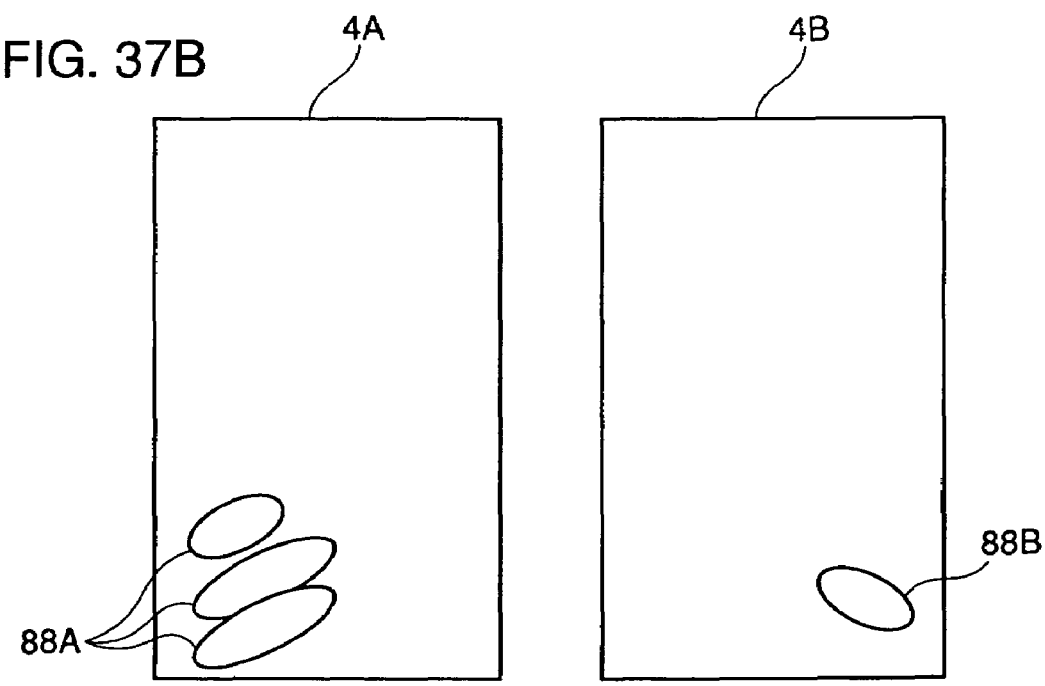
FIG. 37B illustrates a region where fingers touch a flat display which is folded back to back.

FIG. 37B shows regions 88A and 88B of flat displays 4A and 4B touched by fingers when one of flat displays 4A and 4B is rotated to be folded back to back and the display device is supported by one hand. Usually, a user supports the display device such that flat display 4A being supported has a greater area of region 88A touched by finger than the area of region 88B touched by finger of flat display 4B being currently watched. This is because the user tries to support flat display 4B in a manner to obtain a display area as large as possible and support the display device stably by securing the greater area of region 88A touched by finger of flat display 4A being supported.

If one of flat displays 4A and 4B has an area of a touched region greater by at least 20% than that of the other flat display and the touched state lasts for a predetermined time (e.g. three seconds) or more, display control unit 83 causes the one of the flat displays having the greater touched area not to provide display and the other flat display having the smaller touched area to provide display. Further, if flat display 4A has an area of a region touched by a pointer which is almost equal to an area of a region of flat display 4B touched by a pointer and the touched state lasts for at least a predetermined time, display control unit 83 allows flat displays 4A and 4B to give display.

A tablet device for detecting the touched position may be located in any region except the region inside or over the surface of flat displays 4A and 4B.

The display device as described above determines which of the flat displays 4A and 4B is watched by a user based on the areas of regions of flat displays 4A and 4B touched by pointers such as fingers. Then, it is possible to allow only the flat display 4A or 4B watched by the user to provide display and the flat display 4A or 4B not watched by the user not to provide display. Advantages regarding prevention of information leakage and reduction of power consumption can be obtained accordingly. Other advantages are similar to those of the display device in the fifth embodiment.

Ninth Embodiment

A display device according to the ninth embodiment has a functional block structure similar to that of the display device described in conjunction with FIG. 18 according to the fifth embodiment. Therefore, description thereof is not repeated here. A tablet device similar to that described in conjunction with the eighth embodiment is embedded in a flat display 4.

Figures 38, 39:
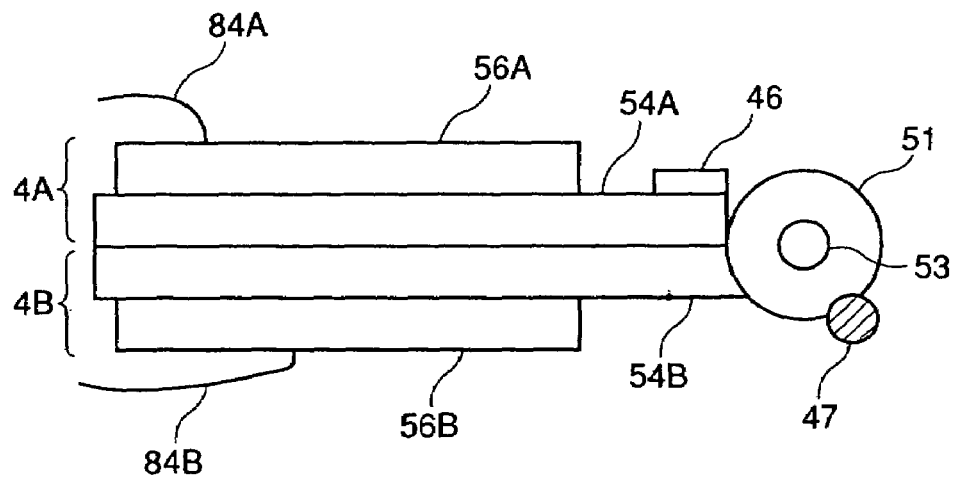
FIG. 38 laterally shows the display device which is closed.
FIG. 39 illustrates a relation between a state of a switch, a state of contact between a pointer and flat displays 4A and 4B and a state of display on flat displays 4A and 4B.

Referring to FIG. 38, flat displays 4A and 4B are coupled via a joint 51 as shown in FIG. 19. A switch presser 47 is formed at joint 51 at a position which causes presser 47 to press a switch 46 when flat displays 4A and 4B form an angle of 200°.

Switch 46 is in OFF state when the angle formed by flat displays 4A and 4B is less than 200° and ON state when the angle is 200° or more.

A display control unit 42 controls display/non-display of flat displays 4A and 4B according to FIG. 39. When switch 46 is in the ON state (the angle formed by flat displays 4A and 4B is at least 200°) and the difference between areas of respective regions of flat displays 4A and 4B touched by a pointer is equal to or less than a predetermined value, display control unit 42 decides that a user watches both of display surfaces 54A and 54B of flat displays 4A and 4B and accordingly allows flat displays 4A and 4B to provide display. If switch 46 is in the ON state and the difference between areas of respective regions of flat displays 4A and 4B touched by a pointer is greater than a predetermined value, display control unit 42 decides that the user watches display surface 54B of only flat display 4B, and causes flat display 4A not to provide display and display 4B only to provide display. If switch 46 is in the OFF state, display control unit 42 decides that the user watches both of display surfaces 54A and 54B of respective flat displays 4A and 4B and causes both of flat displays 4A and 4B to provide display regardless of the magnitude of the difference of touched areas.

The display device described above is accordingly effective similarly to the display device according to the eighth embodiment.

Tenth Embodiment

Figure 40:
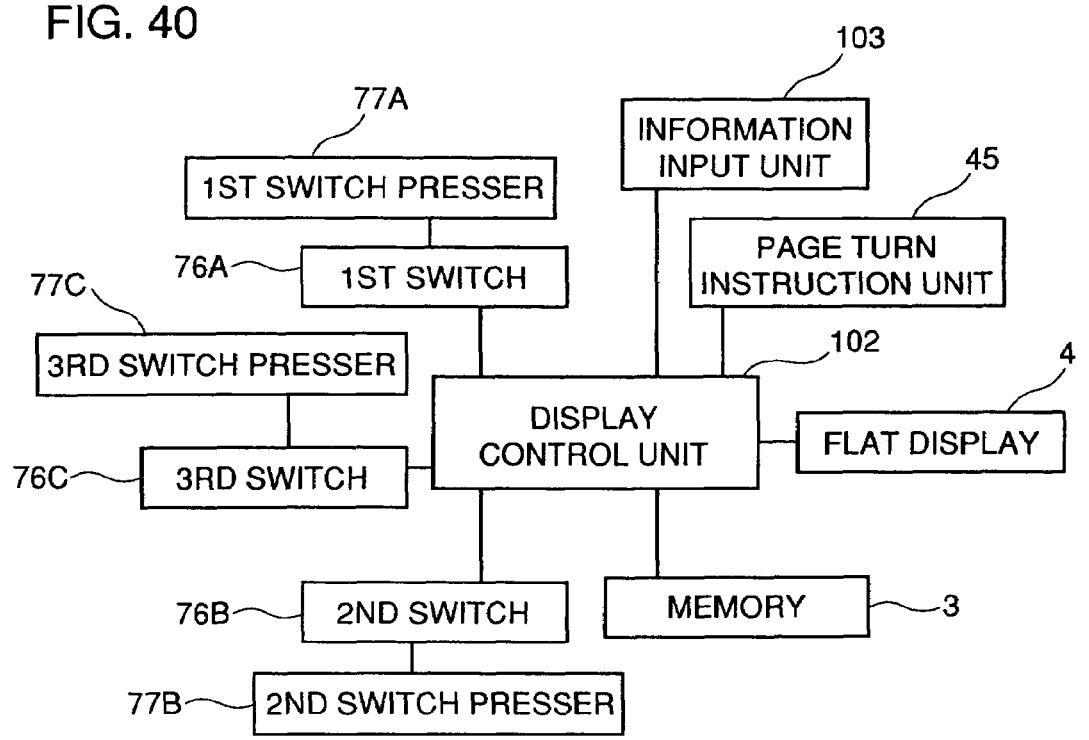
FIG. 40 is a block diagram showing a structure of a display device according to a tenth embodiment.

Referring to FIG. 40, a display device according to the tenth embodiment includes a memory 3, a flat display 4, first, second and third switches 76A, 76B and 76C for detecting the degree of opening (angle of rotation) of flat display 4, first, second and third switch pressers 77A, 77B and 77C serving to press the first, second and third switches 76A, 76B and 76C, a display control unit 102 for controlling reading of image information, character information and the like stored in memory 3 and controlling display/non-display of flat display 4, a page turn instruction unit 45, and an information input unit 103 formed of a keyboard, a function key, a joystick, a tablet device and the like for inputting information to the display device.

Figure 41:
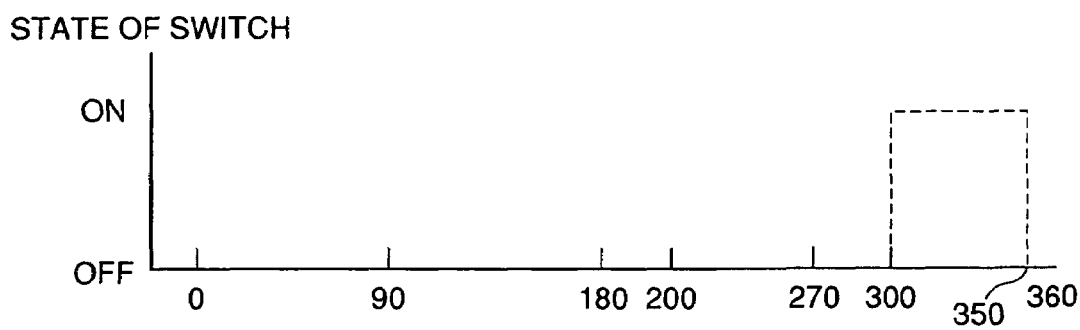
FIG. 41 shows a state of a third switch.

The first and second switches 76A and 76B have a structure similar to that described in conjunction with the sixth embodiment, and the first switch 76A becomes ON state when the angle of rotation of flat display 4 is greater than 0° and equal to or less than 360°. The second switch 76B becomes ON state when the rotational angle of flat display 4 ranges from 200° to 360°. Referring to FIG. 41, the third switch presser 77C is formed around a joint 51 similarly to switch presser 47 described in conjunction with FIG. 21 such that the third switch 76C is made ON when the rotational angle of flat display 4 ranges from 300° to 350°.

Figures 42, 43:
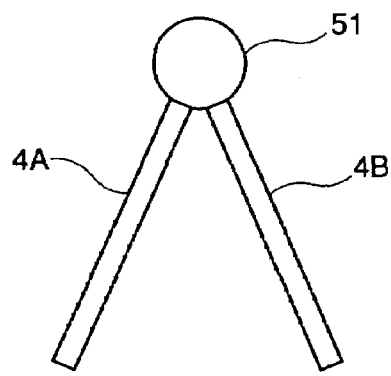
FIG. 42 illustrates a relation between states of first to third switches and states of display on flat displays 4A and 4B.
FIG. 43 shows an exterior of flat displays 4A and 4B being folded back to back.

Display control unit 102 controls whether flat displays 4A and 4B provide display or not according to FIG. 42. Specifically, if the angle formed by flat displays 4A and 4B is greater than 0° and equal to or less than 200°, the first switch 76A is made ON while the second and third switches 76B and 76C are made OFF. Then, display control unit 102 decides that a user watches both of the flat displays 4A and 4B and allows both of the flat displays 4A and 4B to provide display.

If the angle formed by flat displays 4A and 4B is greater than 200° and equal to or less than 300°, the first and second switches 76A and 76B become ON state while the third switch 76C becomes OFF state. Then display control unit 102 decides that the user watches only flat display 4B and causes flat display 4A not to provide display and flat display 4B only to provide display.

Referring to FIG. 43, if the angle formed by flat displays 4A and 4B exceeds 300° and is equal to or less than 350°, all of the first, second and third switches 76A to 76C become ON. Then, display control unit 102 decides that users play a competitive game or the like and fold the display device so as not to show the users' cards to the opponent, and accordingly allows both of the flat displays 4A and 4B to provide display.

If the angle formed by flat displays 4A and 4B is 0°, all of the first, second and third switches 76A to 76C are in OFF state. Then, display control unit 102 decides that the user closes the display device and causes both of flat displays 4A and 4B not to provide display.

Figure 44:
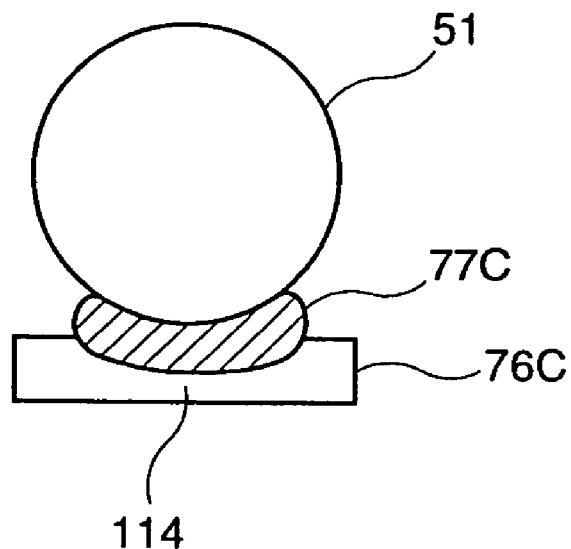
FIG. 44 shows a structure of a third switch and a third switch presser.

Referring to FIG. 44, the third switch 76C is formed to have a shape allowing the third switch presser 77C to fit therein. Accordingly, when the third switch 76C is in ON state, that is, the angle formed by flat displays 4A and 4B is in a specific range from 300° to 350°, both of the flat displays 4A and 4B can be fixed. In this way, the user can conveniently enjoy a competitive game or the like. In order to cancel this fixed state, the user may rotate flat displays 4A and 4B with a force greater than usual.

Figure 45:
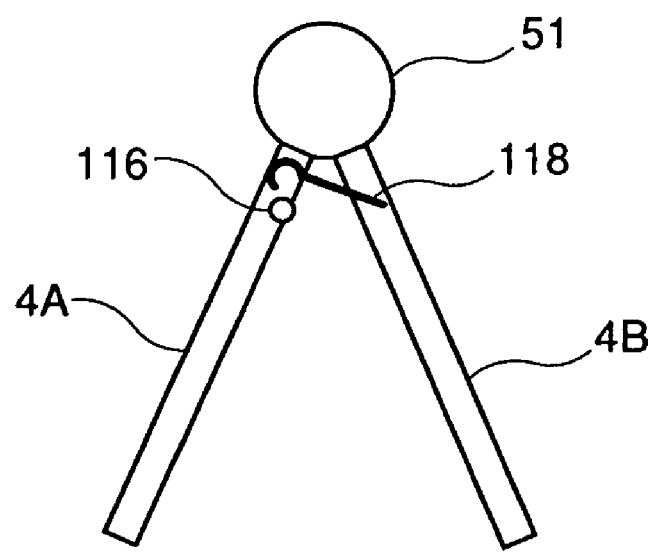
FIG. 45 shows an exterior of a display device having one flat display provided with a pin and the other flat display provided with a hook.

Referring to FIG. 45, flat display 4A may have a pin 116 and flat display 4B may have a hook 118. By appropriately defining the length of hook 118 and the position of pin 116, the angle formed by flat displays 4A and 4B when hook 118 is engaged with pin 116 can be set at a specific angle in a range from 300° to 350°.

Figure 46:
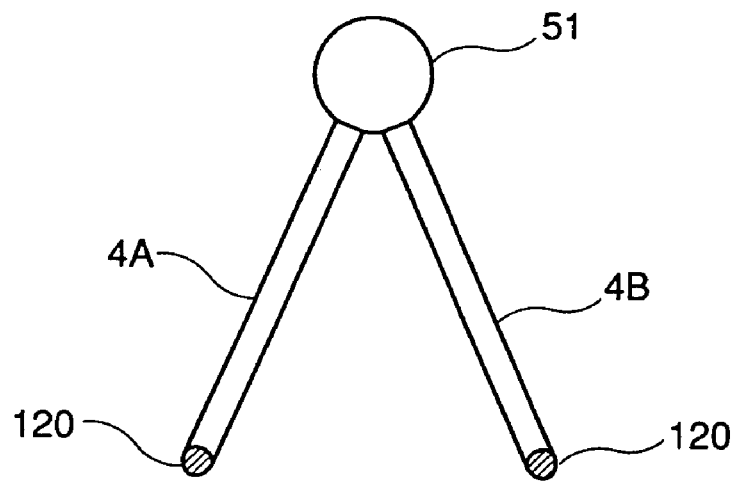
FIG. 46 shows an exterior of a display device to which a coating is applied for the purpose of preventing slip.

Referring to FIG. 46, when flat displays 4A and 4B are stood on a flat surface for use, one side of each of flat displays 4A and 4B, which is in contact with the flat surface, is coated with a material having a great friction coefficient such as a rubber 120 for preventing slipping of the display device.

Figure 47:
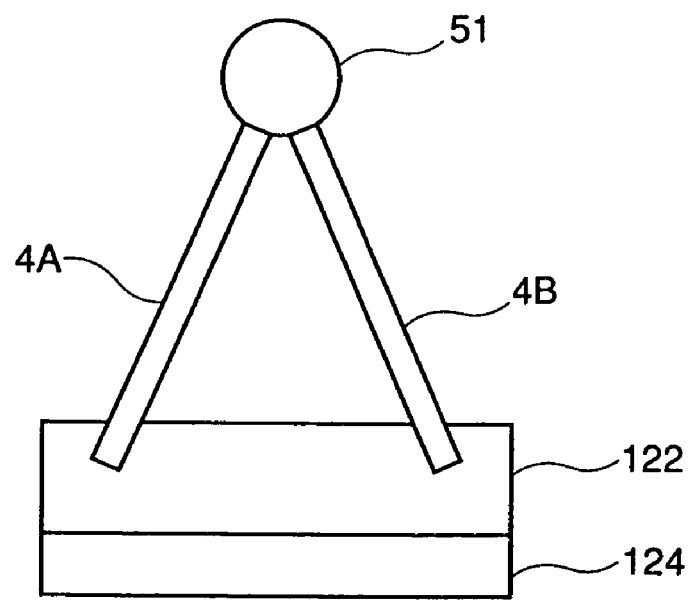
FIG. 47 shows an exterior of a display device placed on a seat for the purpose of preventing slip.

Referring to FIG. 47, flat displays 4A and 4B may be fit in a seat 122 for use in order to prevent the display device from slipping. Seat 122 is coated with a material having a great friction coefficient such as a rubber 124 for preventing slipping of seat 122.

If the angle formed by flat displays 4A and 4B is greater than 350° and equal to or less than 360°, the first and second switches 76A and 76B are in ON state while the third switch 76C is in OFF state. Then, display control unit 102 decides that a user makes flat displays 4A and 4B back to back to watch only the flat display 4B, and accordingly causes flat display 4A not to provide display and flat display 4B only to provide display.

The display device as described above enables a user to enjoy a competitive game with cards of the user not revealed to the opponent.

Flat displays 4A and 4B undergo a process for preventing slipping. Then, the user can perform operations of a game and the like comfortably.

Other effects are similar to those of the display device in the fifth embodiment.

Eleventh Embodiment

Figure 48:
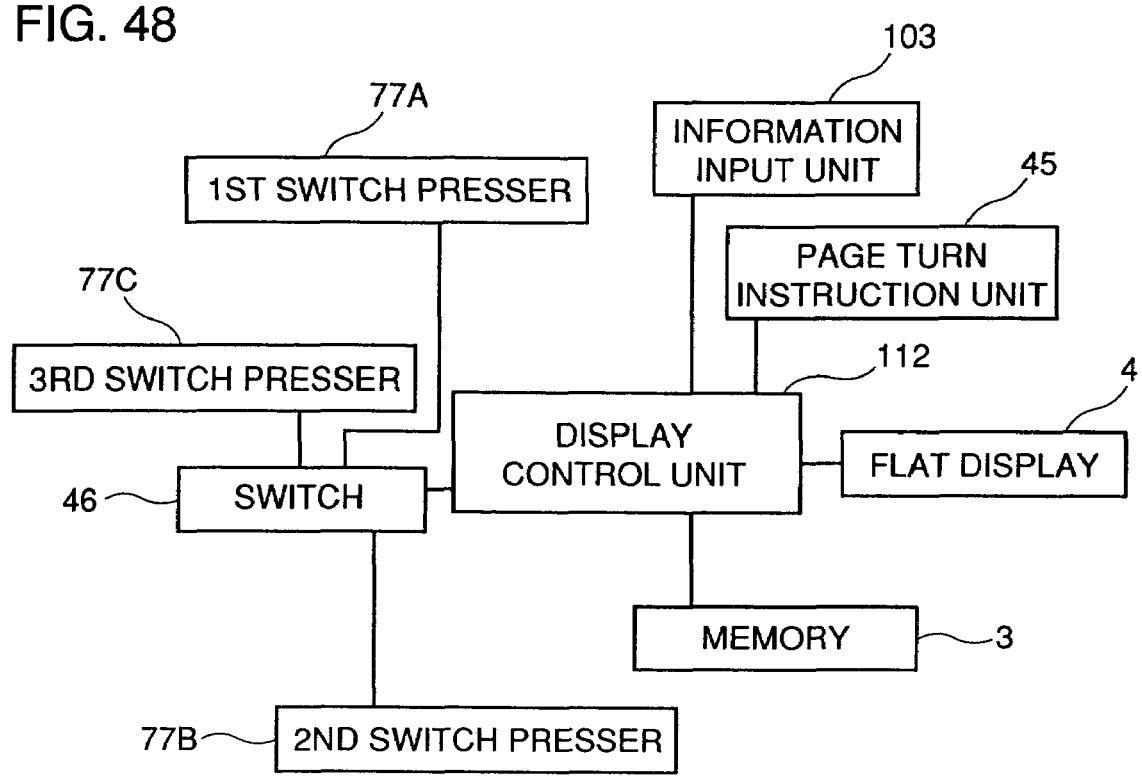
FIG. 48 is a block diagram showing a structure of a display device according to an eleventh embodiment.

Referring to FIG. 48, a display device according to the eleventh embodiment includes a memory 3, a flat display 4, a switch 46 for detecting the degree of opening (angle of rotation) of flat display 4, first, second and third switch pressers 77A, 77B and 77C serving to press switch 46, a display control unit 112 for controlling reading of image information, character information and the like stored in memory 3 and controlling display/non-display of flat display 4, a page turn instruction unit 45, and an information input unit 103 formed of a keyboard, a function key, a joystick, a tablet device and the like for inputting information to the display device.

Figure 49:
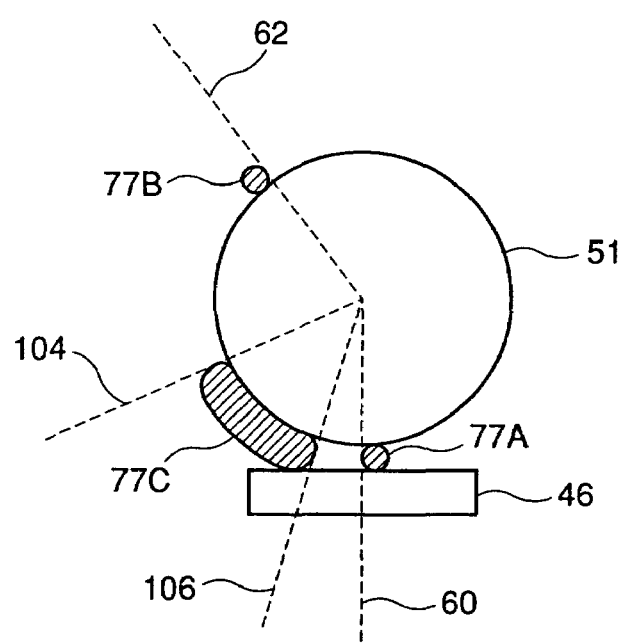
FIG. 49 shows a structure of a switch and first to third switch pressers.

Referring to FIG. 49, the first and second switch pressers 77A and 77B are formed on the periphery of a joint 51 so as to press switch 46 when the angle of rotation of joint 51 is 0° and 200° respectively. The third switch presser 77C is formed on the periphery of joint 51 so as to press switch 46 when the rotational angle of joint 51 is 300° to 350°. Switch 46 provides outputs as shown in FIGS. 31A, 31B and 41. Accordingly, display control unit 112 controls display/non-display of flat displays 4A and 4B similarly to display control unit 102 of the display device according to the tenth embodiment described in conjunction with FIG. 42.

This display device can achieve effects similar to those in the tenth embodiment.

INDUSTRIAL APPLICABILITY 2

As heretofore described, the display device according to the present invention allows a page to be turned as if a paper page is actually turned, being superior in prevention of information leakage and having a small power consumption. Therefore, this display device is appropriate for making an access to information to give the same feeling as that in a normal reading of a book.

What is claimed is:

1. A display device comprising:
information storage means for storing information;
information display means for displaying information;
sound output means for outputting sound;
page turn instruction means for issuing an instruction to switch information displayed on said information display means;
display control means for receiving the instruction from said page turn instruction means to switch information displayed on said information display means; and
sound output control means connected to said display control means for outputting sound of turning a sheet of paper from said sound output means according to switch of information displayed on said information display means and outputting different sounds depending on speed of switching information displayed on said information display means.

2. A display device comprising:
information storage means for storing information;
information display means for displaying information;
a plurality of sound output means for outputting sound;
page turn instruction means for issuing an instruction to switch information displayed on said information display means;
display control means for receiving the instruction from said page turn instruction means to switch information displayed on said information display means; and
sound output control means connected to said display control means for outputting sound of turning a sheet of paper from said sound output means according to switch of information displayed on said information display means and varying a center of the sound outputted from said plurality of sound output means depending on direction of switching information.

* * * * *